United States Patent
Murata et al.

(10) Patent No.: US 11,506,945 B2
(45) Date of Patent: Nov. 22, 2022

(54) LIQUID CRYSTAL DISPLAY DEVICE

(71) Applicant: SHARP KABUSHIKI KAISHA, Sakai (JP)

(72) Inventors: Koji Murata, Sakai (JP); Hidefumi Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/077,486

(22) Filed: Oct. 22, 2020

(65) Prior Publication Data

US 2021/0124223 A1    Apr. 29, 2021

(30) Foreign Application Priority Data

Oct. 24, 2019   (JP) .............................. JP2019-193883

(51) Int. Cl.
| | |
|---|---|
| *G02F 1/1343* | (2006.01) |
| *G02F 1/133* | (2006.01) |
| *G02F 1/1335* | (2006.01) |
| *G02F 1/1362* | (2006.01) |
| *G02F 1/137* | (2006.01) |

(52) U.S. Cl.
CPC ........ *G02F 1/134336* (2013.01); *G02F 1/137* (2013.01); *G02F 1/13306* (2013.01); *G02F 1/13439* (2013.01); *G02F 1/133512* (2013.01); *G02F 1/133514* (2013.01); *G02F 1/136286* (2013.01); *G02F 1/134345* (2021.01)

(58) Field of Classification Search
None
See application file for complete search history.

(56) References Cited

U.S. PATENT DOCUMENTS

| | | |
|---|---|---|
| 2007/0040780 A1 | 2/2007 | Gass et al. |
| 2007/0146606 A1 | 6/2007 | Yamashita |
| 2011/0012924 A1 | 1/2011 | Gass et al. |
| 2012/0056914 A1 | 3/2012 | Gass et al. |
| 2012/0147026 A1 | 6/2012 | Gass et al. |
| 2012/0306797 A1* | 12/2012 | Misaki .................. G06F 3/0412 345/173 |

(Continued)

FOREIGN PATENT DOCUMENTS

| | | |
|---|---|---|
| JP | 2007-178907 A | 7/2007 |
| JP | 2011-253206 A | 12/2011 |

*Primary Examiner* — Shan Liu
(74) *Attorney, Agent, or Firm* — ScienBiziP, P.C.

(57) ABSTRACT

A liquid crystal display device includes: a liquid crystal panel including an active matrix substrate, a liquid crystal layer, and a color filter substrate in a stated order, the active matrix substrate including a first substrate, and a first electrode and second electrodes stacked with an insulating layer in between, the second electrodes arranged in the respective sub-pixels, the color filter substrate including a second substrate, a color filter, and a third electrode, either the first electrode or the second electrodes arranged with electrical connection over the sub-pixels, each of the sub-pixels provided with an optical opening, the third electrode not superimposed with at least a portion of each of the optical openings in a plan view and arranged with electrical connection, a control circuit configured to switch between application of alternating voltage and application of constant voltage to the third electrode.

15 Claims, 21 Drawing Sheets

(56) References Cited

U.S. PATENT DOCUMENTS

| | | | |
|---|---|---|---|
| 2013/0100112 A1* | 4/2013 | Yeh | G09G 3/3611 |
| | | | 345/213 |
| 2014/0062984 A1* | 3/2014 | Miyatake | G09G 3/3614 |
| | | | 345/211 |
| 2015/0346564 A1* | 12/2015 | Moriwaki | G02F 1/13439 |
| | | | 349/43 |
| 2016/0341987 A1* | 11/2016 | Chung | G02F 1/134363 |
| 2017/0192263 A1* | 7/2017 | Jiang | G02F 1/1323 |
| 2017/0358270 A1* | 12/2017 | Hsu | G02F 1/133512 |
| 2020/0159050 A1* | 5/2020 | Chung | G09G 3/36 |
| 2021/0149511 A1* | 5/2021 | Chung | G02F 1/134309 |

* cited by examiner

Contrast ratio contour (Transmittance)

Contrast ratio contour (Transmittance)

LIQUID CRYSTAL DISPLAY DEVICE

CROSS-REFERENCE TO RELATED APPLICATIONS

The present application claims priority under 35 U.S.C. § 119 to Japanese Patent Application No. 2019-193883 filed on Oct. 24, 2019, the contents of which are incorporated herein by reference in their entirety.

BACKGROUND OF THE INVENTION

Field of the Invention

The present invention relates to a liquid crystal display device.

Description of Related Art

Liquid crystal display devices are display devices utilizing a liquid crystal composition to display images. In a typical display mode thereof, voltage is applied to a liquid crystal composition sealed between paired substrates such that the alignment of liquid crystal molecules in the liquid crystal composition is changed according to the applied voltage, whereby the amount of light passing through the paired substrates is controlled. Such liquid crystal display devices have advantageous features such as thin profile, light weight, and low power consumption, and are therefore used in a variety of fields.

Studies to enhance the viewing angle characteristics of liquid crystal display devices have been made such that the same image can be observed regardless of whether the viewing angle range is narrow or wide. Meanwhile, a display method considered in terms of privacy protection is one that allows observation of an image in a narrow viewing angle range but makes the image difficult to observe in a wide viewing angle range.

For example, JP 2007-178907 A discloses a liquid crystal display device having an FFS structure generating a lateral electric field between a first electrode and a second electrode on a first substrate, wherein a third electrode for generating a vertical electric field with the first electrode and the second electrode is arranged on a second substrate facing the first substrate. Here, the liquid crystal display device is meant to control the vertical electric field for viewing angle control.

JP 2011-253206 A discloses a liquid crystal display device including a liquid crystal display panel, first and second sets of regions in the liquid crystal display panel, and circuitry being adapted to apply an electric field in first and second different ways in the first and second sets of regions respectively, wherein a display can be switched between a public mode and a private mode, and a masking image is displayed in the private mode. Herein, this technique is referred to as a soft veil-view technique (function).

BRIEF SUMMARY OF THE INVENTION

The liquid crystal display device disclosed in JP 2007-178907 A does not easily achieve a sufficient transmittance and a sufficient contrast ratio. It is also difficult for the device to ensure sufficient privacy in terms of observation from an oblique direction. The liquid crystal display device disclosed in JP 2011-253206 A cannot ensure sufficient privacy in terms of observation from the left-right directions of its display screen, although making an image difficult to observe from a direction oblique to its display screen.

In response to the above issues, an object of the present invention is to provide a liquid crystal display device that can incorporate the soft veil-view function and achieve a high transmittance and a high contrast ratio while ensuring privacy by making its liquid crystal panel less observable from the left-right and oblique directions.

(1) One embodiment of the present invention is directed to a liquid crystal display device including: a liquid crystal panel; and a control circuit, the liquid crystal panel including sub-pixels arranged in a matrix pattern in an in-plane direction and including an active matrix substrate, a liquid crystal layer containing liquid crystal molecules, and a color filter substrate in a stated order, the active matrix substrate including a first substrate, and a first electrode and second electrodes stacked with an insulating layer in between, the second electrodes arranged in the respective sub-pixels, the color filter substrate including a second substrate, a color filter, and a third electrode, either the first electrode or the second electrodes arranged with electrical connection over the sub-pixels, each of the sub-pixels provided with an optical opening that allows light to pass through the liquid crystal panel, the third electrode not superimposed with at least a portion of each of the optical openings in a plan view and arranged with electrical connection, the control circuit configured to switch between application of alternating voltage and application of constant voltage to the third electrode.

(2) In an embodiment of the present invention, the liquid crystal display device includes the structure (1), and the liquid crystal display device includes a dielectric layer between the third electrode and the liquid crystal layer.

(3) In an embodiment of the present invention, the liquid crystal display device includes the structure (2), and the second substrate, the third electrode, the color filter, and the dielectric layer are arranged in a stated order.

(4) In an embodiment of the present invention, the liquid crystal display device includes the structure (1), the color filter is a dielectric layer, and the second substrate, the third electrode, the color filter, and the liquid crystal layer are arranged in a stated order.

(5) In an embodiment of the present invention, the liquid crystal display device includes any one of the structures (1) to (4), and the third electrode has a light-shielding property.

(6) In an embodiment of the present invention, the liquid crystal display device includes the structure (5), and the third electrode is a single- or multi-layered light-shielding electrode containing aluminum, molybdenum, chromium, titanium, or an alloy of any of these metals.

(7) In an embodiment of the present invention, the liquid crystal display device includes any one of the structures (1) to (4), and the third electrode is a transparent electrode.

(8) In an embodiment of the present invention, the liquid crystal display device includes any one of the structures (1) to (7), and the third electrode surrounds the optical openings in a plan view.

(9) In an embodiment of the present invention, the liquid crystal display device includes any of the structures (1) to (7), the active matrix substrate includes a gate line and a source line that crosses the gate line, and the third electrode is superimposed with at least one of the gate line or the source line.

(10) In an embodiment of the present invention, the liquid crystal display device includes any of the structures (1) to (9), the color filter substrate further includes a black matrix that is formed from a black resin and arranged around the optical openings in a plan view, and the third electrode is superimposed with the black matrix.

(11) In an embodiment of the present invention, the liquid crystal display device includes the structure (10), and the second substrate, the third electrode, and the black matrix are arranged in a stated order.

(12) In an embodiment of the present invention, the liquid crystal display device includes the structure (10), and the second substrate, the black matrix, and the third electrode are arranged in a stated order.

(13) In an embodiment of the present invention, the liquid crystal display device includes any one of the structures (1) to (12), the liquid crystal display device provides a first display mode that allows a first image to be observed in a narrow viewing angle range including a direction normal to the liquid crystal panel, and a second display mode that allows the first image to be observed in a wide viewing angle range including the narrow viewing angle range, and the control circuit applies alternating voltage to the third electrode in the first display mode and applies constant voltage, which is common to the first electrode or the second electrodes, to the third electrode in the second display mode.

(14) In an embodiment of the present invention, the liquid crystal display device includes the structure (13), the liquid crystal molecules align in a direction horizontal to the active matrix substrate in a non-voltage application state in which no voltage is applied to the liquid crystal layer, the liquid crystal molecules in the first display mode align at a different azimuth while forming an angle with the active matrix substrate under an influence of electric fields generated by the first electrode, the second electrodes, and the third electrode, and the liquid crystal molecules in the second display mode align at a different azimuth while aligning parallel to the active matrix substrate under an influence of an electric field generated between the first electrode and the second electrodes.

(15) In an embodiment of the present invention, the liquid crystal display device includes the structure (13) or (14), the liquid crystal panel includes display units that utilize a soft veil-view function to display an image, the display units each include a pair of sub-pixels arranged adjacent to each other, one of the sub-pixels being a first sub-pixel selected from odd-number lines and the other being a second sub-pixel selected from even-number lines, and the control circuit in the first display mode supplies different image signals to the respective sub-pixels so as to allow a second image, different from the first image, to be observed in the wide viewing angle range.

(16) Preferably, the liquid crystal display device includes a first alignment film between the active matrix substrate and the liquid crystal layer and a second alignment film between the color filter substrate and the liquid crystal layer, and the first alignment film and the second alignment film are horizontal alignment films. A horizontal alignment film preferably sets the rising angle of liquid crystal molecules from the surface of the alignment film, i.e., pre-tilt angle, in the initial stage (state where no voltage is applied to the liquid crystal layer) to 0° to 1°. Meanwhile, with an initial pre-tilt angle of, for example, 3° to 15°, the viewing angle characteristics when the liquid crystal panel is perceived from the viewer side can be made asymmetrical with respect to the up-down directions of the liquid crystal panel. Specifically, in the case where a liquid crystal molecule parallel to the substrate plane at an azimuth of 90° rises +3° to +15° in the vertical direction (pre-tilt angle: +3° to +15°), the viewing angle is narrow in the up direction. In the case where a liquid crystal molecule parallel to the substrate plane at an azimuth of 270° rises +3° to +15° in the vertical direction (pre-tilt angle: +3° to +15°), the viewing angle is narrow in the down direction.

The present invention can provide a liquid crystal display device that can incorporate the soft veil-view function and achieve a high transmittance and a high contrast ratio while ensuring privacy by making its liquid crystal panel less observable from the left-right and oblique directions. In particular, a liquid crystal display device of the present invention can achieve a high transmittance and a high contrast ratio because vertical electric fields tend not to affect liquid crystal molecules in optical openings in sub-pixels when an image is displayed in a wide viewing angle mode.

DETAILED DESCRIPTION OF THE INVENTION

Hereinafter, an embodiment of the present invention is described. The present invention is not limited to the following embodiment, and the design of the present invention can be modified as appropriate within the range satisfying the configuration of the present invention. Hereinafter, like reference signs refer to the same portions or the portions having the same function throughout the drawings, and redundant description of already described portions is omitted as appropriate. The modes in the present invention may appropriately be combined within the gist of the present invention.

A liquid crystal display device according to an embodiment of the present invention includes: a liquid crystal panel; and a control circuit, the liquid crystal panel including sub-pixels arranged in a matrix pattern in an in-plane direction and including an active matrix substrate, a liquid crystal layer containing liquid crystal molecules, and a color filter substrate in a stated order, the active matrix substrate including a first substrate, and a first electrode and second electrodes stacked with an insulating layer in between, the second electrodes arranged in the respective sub-pixels, the color filter substrate including a second substrate, a color filter, and a third electrode, either the first electrode or the second electrodes arranged with electrical connection over the sub-pixels, each of the sub-pixels provided with an optical opening that allows light to pass through the liquid crystal panel, the third electrode not superimposed with at least a portion of each of the optical openings in a plan view and arranged with electrical connection, the control circuit configured to switch between application of alternating voltage and application of constant voltage to the third electrode.

Figure 1:
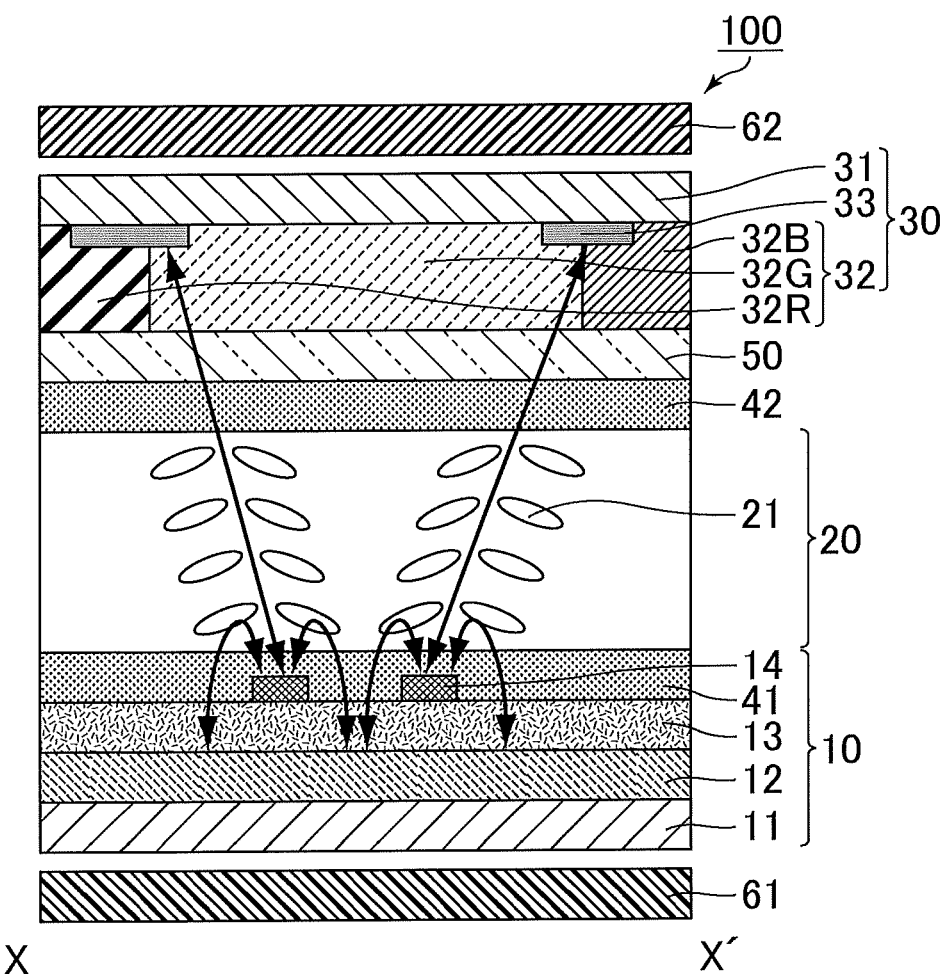
FIG. 1 is a schematic cross-sectional view of a sub-pixel, showing an exemplary liquid crystal display device according to an embodiment.
Figure 2:
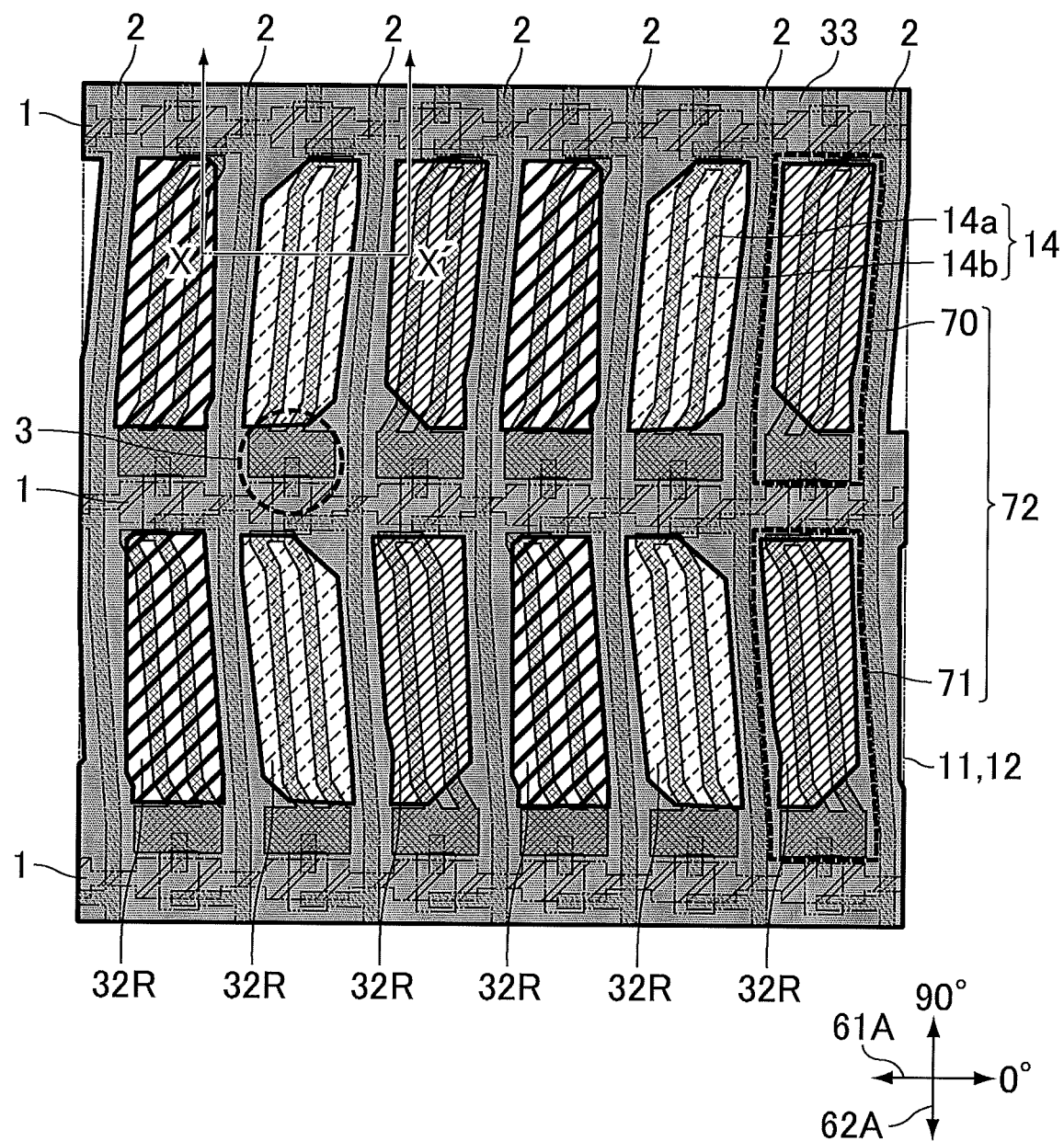
FIG. 2 is a schematic plan view showing a first example of the liquid crystal display device according to the embodiment.

The liquid crystal display device according to the embodiment is described below with reference to the drawings. FIG. 1 is a schematic cross-sectional view of a sub-pixel, showing an exemplary liquid crystal display device according to the embodiment. FIG. 2 is a schematic plan view showing a first example of the liquid crystal display device according to the embodiment. FIG. 1 is a cross-sectional view taken along the line X-X' in FIG. 2. The "sub-pixel" as used herein refers to a region surrounded by two adjacent gate lines 1 and two adjacent source lines 2 on an active matrix substrate 10 as shown in FIG. 2 described later. The expression "arranged with electrical connection" as used herein refers to arrangement in which an electrode is not electrically divided within the region in which the electrode is arranged and a desired magnitude of voltage is applied to the whole electrode.

As shown in FIG. 1, a liquid crystal panel 100 includes an active matrix substrate 10, a liquid crystal layer 20, and a color filter substrate 30 in the stated order. Herein, the side closer to the screen (display screen) of the liquid crystal display device is also referred to as the "viewer side (front surface side)", and the side farther from the screen (display screen) of the liquid crystal display device is also referred to as the "back surface side".

The active matrix substrate 10 includes a first substrate 11, and a first electrode 12 and second electrodes 14 stacked with an insulating layer 13 in between. The first electrode 12 and the second electrodes 14 are stacked with the insulating layer 13 in between and constitute a fringe field switching (FFS) electrode structure. The insulating layer 13 may be formed from, for example, an inorganic material such as silicon oxide or silicon nitride.

The first electrode 12 is preferably a solid electrode. One first electrode 12 may be arranged in each sub-pixel, may be arranged common to some sub-pixels, or may be formed over the entire display region regardless of the boundaries of the sub-pixels. The solid electrode means an electrode without any slit or opening in a region superimposed with the optical opening of each sub-pixel at least in a plan view. The first electrode 12 may be formed from, for example, a transparent conductive material such as indium tin oxide (ITO) or indium zinc oxide (IZO).

One second electrode 14 is arranged in each sub-pixel. Each second electrode 14 is preferably provided with a slit or an opening. For example, as shown in FIG. 2, the second electrode 14 may be provided with an opening 14b surrounded by a linear electrode portion 14a. The second electrode 14 may be formed from, for example, a transparent conductive material such as ITO or IZO. The second electrode 14 is electrically connected to, for example, a corresponding source line 2 through a semiconductor layer in a corresponding TFT 3.

As shown in FIG. 2, either the first electrode 12 or the second electrodes 14 are arranged with electrical connection over the sub-pixels. The expression "over the sub-pixels" means that the electrode is superimposed with the sub-pixels by crossing the boundaries of the sub-pixels. Either the first electrode 12 or the second electrodes 14 electrically connected over the sub-pixels can apply common constant voltage to the sub-pixels.

The liquid crystal panel 100 includes sub-pixels 70 arranged in a matrix pattern in the in-plane direction. Each sub-pixel 70 is provided with an optical opening that allows light to pass through the liquid crystal panel 100. The optical opening is a region surrounded by the thick line inside each sub-pixel 70 in FIG. 2. In the case where the liquid crystal panel 100 is a transmissive one, the optical opening allows light emitted from the back surface of the liquid crystal panel 100 to travel toward the front surface of the liquid crystal panel 100. In the case where the liquid crystal panel 100 is a reflective one, the optical opening allows incident light, which enters from the outside of the liquid crystal panel 100, and reflected light, which is the incident light emitted toward the outside of the liquid crystal panel 100 after being reflected inside the liquid crystal panel 100, to pass through the liquid crystal panel 100. The optical opening may be superimposed with, for example, a transparent component such as a polarizer or a color filter in a plan view.

As shown in FIG. 1 and FIG. 2, the active matrix substrate 10 includes, on the first substrate 11, gate lines 1 extending parallel to each other and source lines 2 extending parallel to each other in the direction crossing the gate lines 1, with an insulating film in between. The gate lines 1 and the source lines 2 are formed in a grid pattern as a whole. At each intersection between a gate line 1 and a source line 2 is arranged a thin-film transistor (TFT) 3 as a switching element. The gate lines 1 and the source lines 2 may be formed from, for example, a metal material such as aluminum, copper, titanium, molybdenum, chromium, or an alloy of any of these metals.

The first substrate 11 and the later-described second substrate 31 are not limited, and may each be, for example, a substrate formed from a resin such as polycarbonate or a glass substrate.

The liquid crystal layer 20 contains liquid crystal molecules 21. The liquid crystal molecules 21 preferably have a positive anisotropy of dielectric constant ($\Delta\varepsilon$) defined by the following formula (positive type). Also, the liquid crystal molecules 21 preferably align homogeneously in the state where no voltage is applied (in the non-voltage application state). The direction in which the major axes of the liquid crystal molecules 21 are oriented in the non-voltage application state is also referred to as the initial alignment direction of the liquid crystal molecules. The non-voltage application state includes the states where the magnitude of the applied voltage is lower than the threshold voltage for the liquid crystal molecules.

$\Delta\varepsilon$=(dielectric constant in liquid crystal molecule major axis direction)−(dielectric constant in liquid crystal molecule minor axis direction)   (L)

The color filter substrate 30 includes a second substrate 31, color filters 32, and a third electrode 33. The color filter substrate may further include a black matrix formed from a black resin. The black matrix is not limited and can be one usually used in the field of liquid crystal display devices.

The color filters 32 are arranged in the respective sub-pixels 70 such that the color filters 32 are superimposed with the optical openings when the liquid crystal display device 100 is observed from the front surface side. The color filters 32 include, for example, red color filters 32R, green color filters 32G, and blue color filters 32B. For example, the color filters 32 may be formed such that color filters having the same color are arranged consecutively in the column direction or the row direction of the liquid crystal display device 100. Even in such an arrangement, the color filters 32 are arranged in the respective sub-pixels 70 such that the color filters 32 are superimposed with the optical openings since the components such as the third electrode 33 and the black matrix blocks light when the liquid crystal display device 100 is observed from the front surface side. The color filters 32 are each preferably a dielectric layer.

As shown in FIG. 2, the third electrode 33 is not superimposed with at least a portion of each of the optical openings in a plan view. Also, the third electrode 33 is arranged with electrical connection. The third electrode 33, being arranged with electrical connection, can apply common voltage to sub-pixels superimposed with the third electrode 33. Since the third electrode 33 is not superimposed with at least a portion of each of the optical openings in a plan view, vertical electric fields tend not to affect liquid crystal molecules in the openings of the sub-pixels when an image is displayed in a wide viewing angle mode. Thus, a high transmittance and a high contrast ratio can be achieved.

The third electrode 33 can also be formed such that it is not superimposed with the optical openings at all in a plan view. The third electrode 33 may be arranged around the optical openings in a plan view or may extend from the outer edge of each optical opening toward the inside of the optical opening so as to be superimposed with a portion of the optical opening. The portions "around the optical openings" refer to regions between optical openings adjacent in the row direction and the column direction of the liquid crystal panel 100. The third electrode 33 has only not to be superimposed with at least a portion of each of the optical openings in a plan view, and may be arranged to surround at least a portion of each of the optical openings or may be arranged between optical openings adjacent at least in the row direction or in the column direction.

The liquid crystal display device according to the embodiment can also include an in-cell touch panel. When a touch panel is touched with the finger in the case where the counter electrode in the color filter substrate is a solid electrode, the solid electrode inhibits formation of capacitance between the finger and the touch panel. In contrast, the liquid crystal display device according to the embodiment can detect capacitance between the finger and the touch panel through the optical openings where the third electrode 33 is not arranged, so that the liquid crystal display device can utilize an in-cell touch panel.

The third electrode 33 has only to have conductivity and may also have a light-shielding property. Use of a conductive material having a light-shielding property can reduce load for the production process because the material can impart the third electrode 33 with a function as a black matrix.

The third electrode 33 may be a single- or multi-layered light-shielding electrode containing aluminum, molybdenum, chromium, titanium, or an alloy of any of these metals. These metals have a higher magnitude of electrical conductivity than transparent electrodes such as ITO. Thus, when such a metal is arranged as the third electrode on the color filter substrate and white display is provided in a narrow viewing angle mode, a drop in voltage due to changes in waveform of alternating current (AC) voltage applied to the third electrode, such as waveform rounding or blunting, can be reduced. As a result, the light gradient (luminance gradient) inside the screen of the panel can be reduced, whereby the display quality can be enhanced.

The third electrode may be a transparent electrode. The transparent electrode may be formed from, for example, a transparent conductive material such as ITO or IZO. In the case where the third electrode is a transparent electrode, the third electrode is preferably superimposed with the black matrix.

Figure 3:
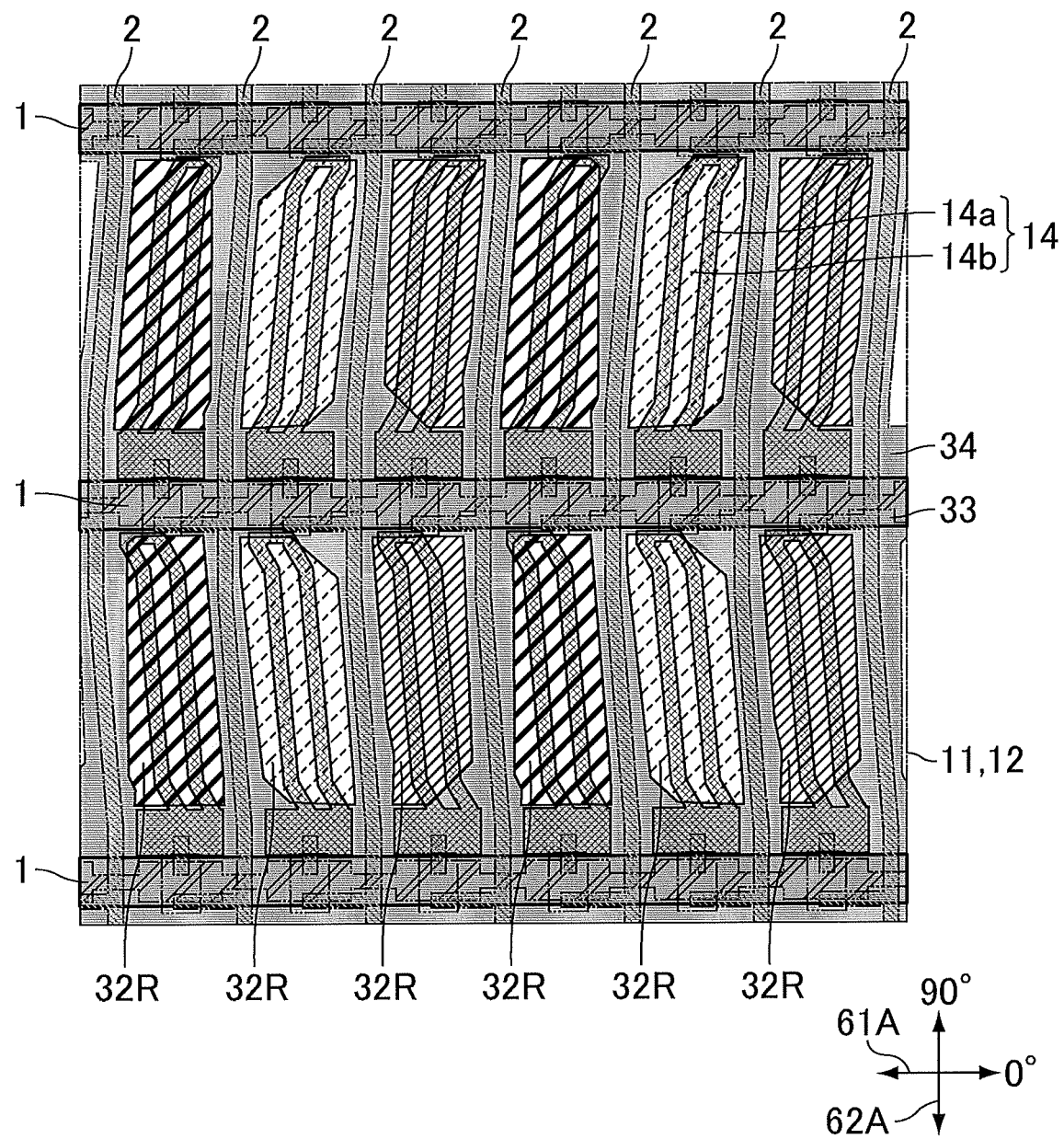
FIG. 3 is a schematic plan view showing a second example of the liquid crystal display device according to the embodiment.
Figure 4:
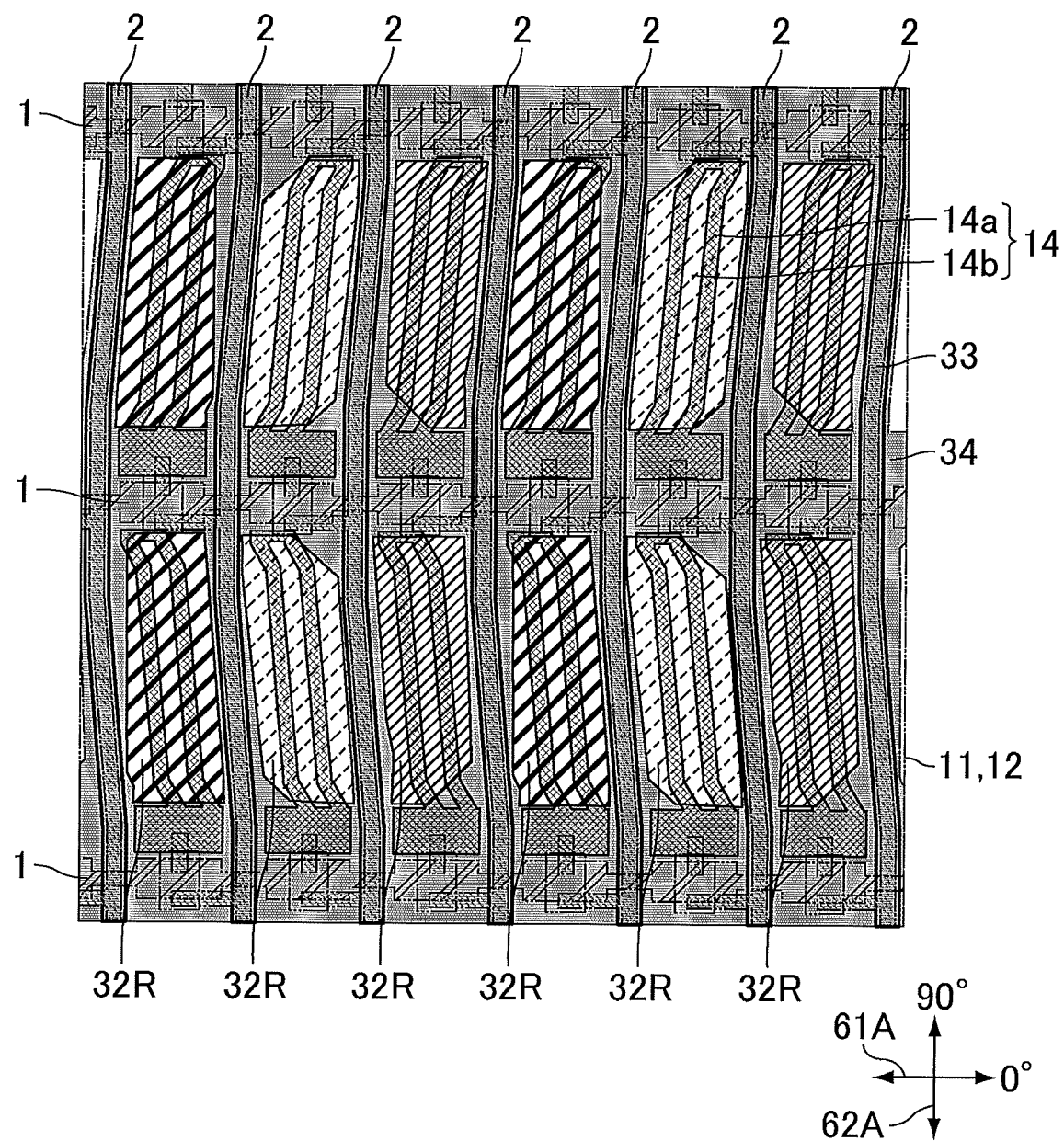
FIG. 4 is a schematic plan view showing a third example of the liquid crystal display device according to the embodiment.
Figure 5:
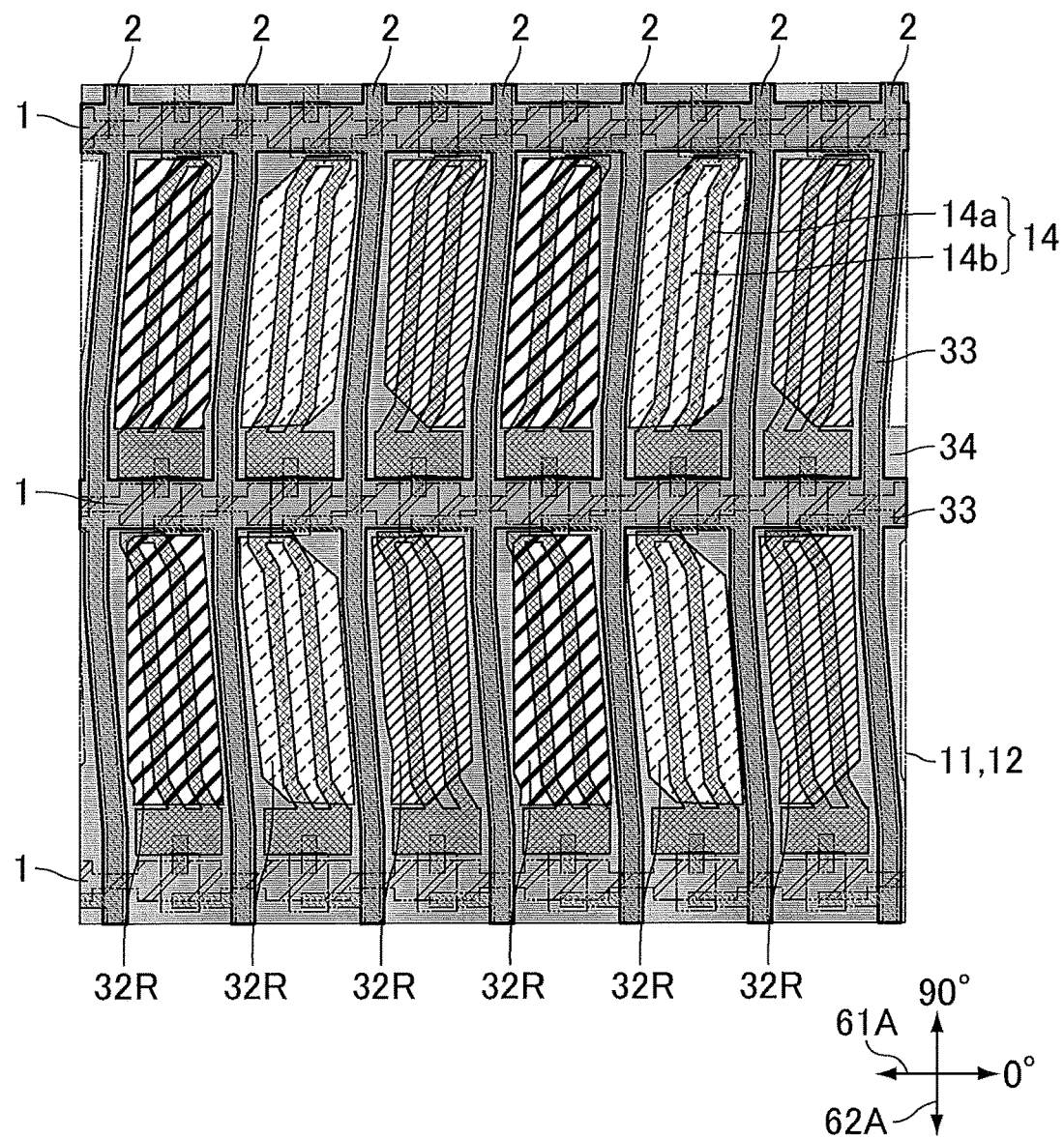
FIG. 5 is a schematic plan view showing a fourth example of the liquid crystal display device according to the embodiment.

FIG. 3 to FIG. 5 are each a schematic plan view showing the liquid crystal display device according to the embodiment. FIG. 3 shows the second example, FIG. 4 shows the third example, and FIG. 5 shows the fourth example. As in the first example shown in FIG. 2, the third electrode 33 may be arranged to surround at least a portion of each of the optical openings in a plan view. In this case, the third electrode 33 more preferably has a light-shielding property, so that the third electrode 33 can also function as a light-shielding component corresponding to the black matrix.

The third electrode 33 may be superimposed with at least one of the gate lines 1 or the source lines 2. The third electrode 33 may be superimposed with the gate lines 1 as in the second example shown in FIG. 3, may be superimposed with the source lines 2 as in the third example shown in FIG. 4, or may be superimposed with both the gate lines 1 and the source lines 2 as in the fourth example shown in FIG. 5.

The color filter substrate may further include a black matrix 34 formed from a black resin and arranged around the optical openings in a plan view. The black matrix 34 may be arranged to surround at least a portion of each of the optical openings, and has only to be arranged between the optical openings adjacent at least in the row direction or in the column direction. The third electrode may be superimposed with the black matrix. FIG. 3 to FIG. 5 show examples in which the third electrode 33 is superimposed with the black matrix 34 arranged to surround the optical openings in a plan view.

Figure 6:
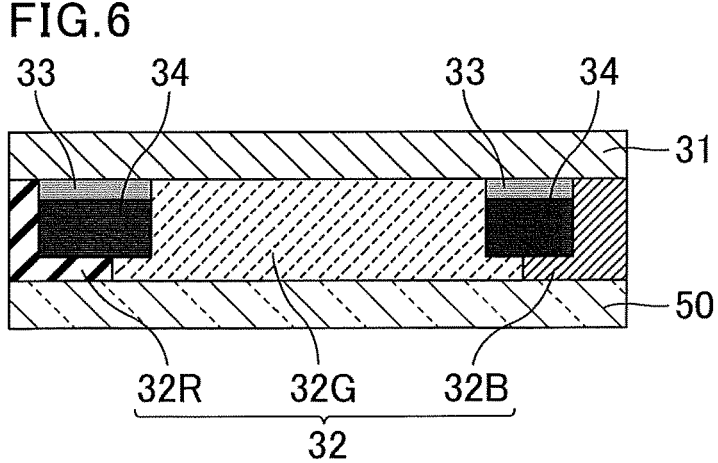
FIG. 6 is a schematic plan view showing Modified Example 1 of a color filter substrate in the liquid crystal display device according to the embodiment.
Figure 7:
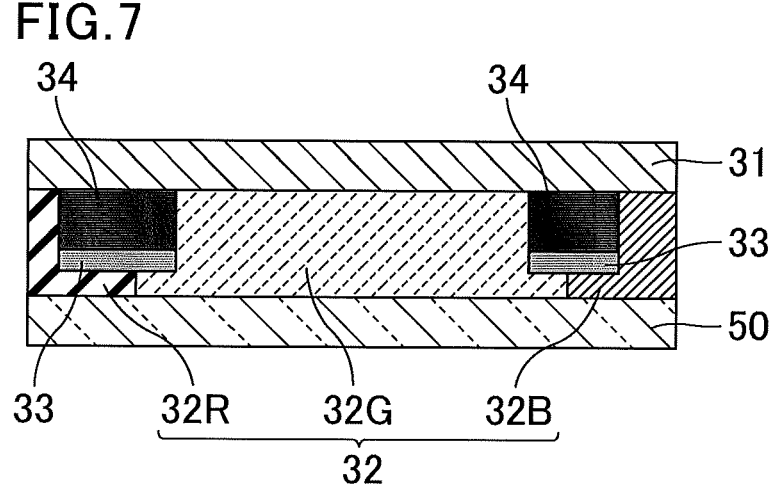
FIG. 7 is a schematic plan view showing Modified Example 2 of the color filter substrate in the liquid crystal display device according to the embodiment.
Figure 8:
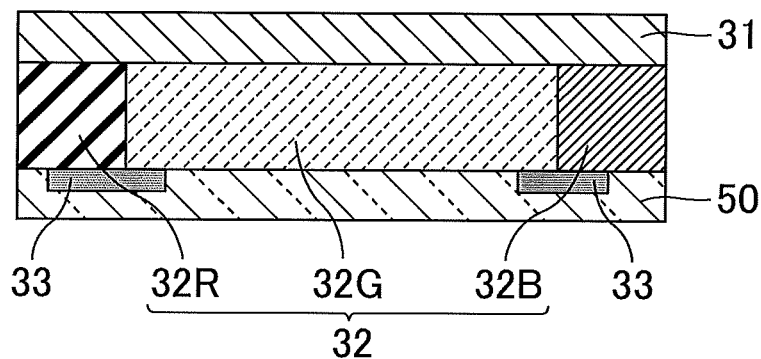
FIG. 8 is a schematic plan view showing Modified Example 3 of the color filter substrate in the liquid crystal display device according to the embodiment.

Hereinafter, the cross-sectional structure of the color filter substrate is described with reference to FIG. 1 and FIG. 6 to FIG. 8. FIG. 6 to FIG. 8 are each a schematic plan view showing the color filter substrate of the liquid crystal display device according to the embodiment. FIG. 6 shows Modified Example 1. FIG. 7 shows Modified Example 2. FIG. 8 shows Modified Example 3. The liquid crystal display devices shown in FIG. 6 to FIG. 8 have the same structure as that shown in FIG. 1 except that the structures of the third electrode and/or the black matrix are different.

Although the liquid crystal layer 20 is omitted in FIG. 6 to FIG. 8, the liquid crystal display devices may include a dielectric layer 50 between the third electrode 33 and the liquid crystal layer 20 as shown in FIG. 1. The dielectric layer 50 may have a dielectric constant ε of 3 to 4, for example. The dielectric layer preferably has a thickness of 0.5 µm or greater and 4 µm or smaller. The dielectric layer having a thickness greater than 4 µm may cause parallax to lower the display quality. When the color filters 32 are each a dielectric layer and the third electrode 33, the color filters 32, and the dielectric layer 50 are arranged in the stated order, the thickness of the dielectric layer means the sum of the thicknesses of the layer of the color filters 32 and the dielectric layer 50.

As shown in FIG. 1, the second substrate 31, the third electrode 33, the color filters 32, and the dielectric layer 50 may be arranged in the stated order. Also, the color filters 32 may each be a dielectric layer, and the second substrate 31, the third electrode 33, the color filters 32, and the liquid crystal layer 20 may be arranged in the stated order. Also when the color filters 32 are each a dielectric layer, the liquid crystal display device may include the dielectric layer 50 between the color filters 32 and the liquid crystal layer 20. The structure shown in FIG. 1 is more easily producible and has a smaller process load than the structures of Modified Examples 1 to 3 described below. Also, the distance between the third electrode 33 and the second electrodes 14 is longer and the intensity of the vertical electric fields formed between the third electrode 33 and the second electrodes 14 is lower than in the later-described Modified Examples 2 and 3. Thus, the contrast ratio when an image is displayed in the later-described wide viewing angle mode can be made higher.

As in Modified Example 1 shown in FIG. 6, the second substrate 31, the third electrode 33, and the black matrix 34 may be arranged in the stated order. Since the distance between the third electrode 33 and the second electrode 14 in Modified Example 1 is longer than in Modified Examples 2 and 3 as in the structure shown in FIG. 1, the contrast ratio when an image is displayed in the later-described wide viewing angle mode can be made higher. Also, the third electrode 33 can be formed on the second substrate 31, which has excellent heat resistance, differently from Modified Examples 3 and 4 in which the third electrode 33 is formed on a resin layer such as the color filters 32 or the black matrix 34. This structure increases the degree of freedom for the formation conditions of the third electrode 33, enabling formation of an electrode better in conductivity or transmittance.

As in Modified Example 2 shown in FIG. 7, the second substrate 31, the black matrix 34, and the third electrode 33 may be arranged in the stated order. In Modified Example 2, reflection on the surface of the third electrode 33 in observation of the liquid crystal display device 100 from the viewer side is reduced, so that the display quality can be enhanced.

As in Modified Example 3 shown in FIG. 8, the second substrate 31, the color filters 32, the third electrode 33, and the dielectric layer 50 may be arranged in the stated order. The distance from the third electrode 33 to the first electrode 12 and the second electrode 14 in Modified Example 3 is shorter than that in the structure shown in FIG. 1. Thus, sufficient electric fields can be generated in the liquid crystal layer 20 even when the absolute value of the counter voltage is small. For this reason, this structure leads to lower power consumption than in Modified Examples 1 and 2 when an image is displayed in the later-described narrow viewing angle mode.

The liquid crystal display device may include a first alignment film 41 between the active matrix substrate 10 and the liquid crystal layer 20 and a second alignment film 42 between the color filter substrate 30 and the liquid crystal layer 20. The first alignment film 41 and the second alignment film 42 control the initial alignment azimuth of the liquid crystal molecules 21 in the non-voltage application state.

The first alignment film and the second alignment film are preferably horizontal alignment films. The horizontal alignment film preferably sets a pre-tilt angle, which is the angle of liquid crystal molecules from the surface of the alignment film, in the initial state (in the non-voltage application state) to 0° to 1°. Meanwhile, with an initial pre-tilt angle of, for example, 3° to 15°, the viewing angle characteristics when the liquid crystal panel is perceived from the viewer side can be made asymmetrical with respect to the up-down directions of the liquid crystal panel. Specifically, in the case where a liquid crystal molecule parallel to the substrate plane at an azimuth of 90° rises +3° to +15° in the vertical direction (pre-tilt angle: +3° to +15°), the viewing angle is narrow in the up direction. In the case where a liquid crystal molecule parallel to the substrate plane at an azimuth of 270° rises +3° to +15° in the vertical direction (pre-tilt angle: +3° to +15°), the viewing angle is narrow in the down direction.

A first polarizer 61 and a second polarizer 62 may be arranged on the side of the active matrix substrate 10 remote from the liquid crystal layer 20 and on the side of the color filter substrate 30 remote from the liquid crystal layer 20, respectively. The first polarizer 61 and the second polarizer 62 are preferably arranged in crossed Nicols such that an absorption axis 61A and an absorption axis 62A are orthogonal to each other. The first polarizer 61 and the second polarizer 62 are preferably linear polarizers.

The liquid crystal display device according to the embodiment provides a first display mode that allows a first image to be observed in a narrow viewing angle range including the direction normal to the liquid crystal panel (such a mode is also referred to as a narrow viewing angle mode) and a second display mode that allows the first image to be observed in a wide viewing angle range including the narrow viewing angle range (such a mode is also referred to as a wide viewing angle mode). In the narrow viewing angle range, the contrast ratio is preferably lower than 2 when the liquid crystal panel is observed at a certain polar angle at an oblique azimuth (an azimuth of 45°, 135°, 225°, or 315°). The polar angle is preferably 60° or greater, more preferably 45° or greater, still more preferably 30° or greater, with the direction vertical to the surface of the liquid crystal panel being defined as a polar angle of 0° and the direction horizontal to the surface of the panel as a polar angle of 90°. The wide viewing angle range refers to a range in which the polar angle is greater than that in the narrow viewing angle range.

Figure 9:
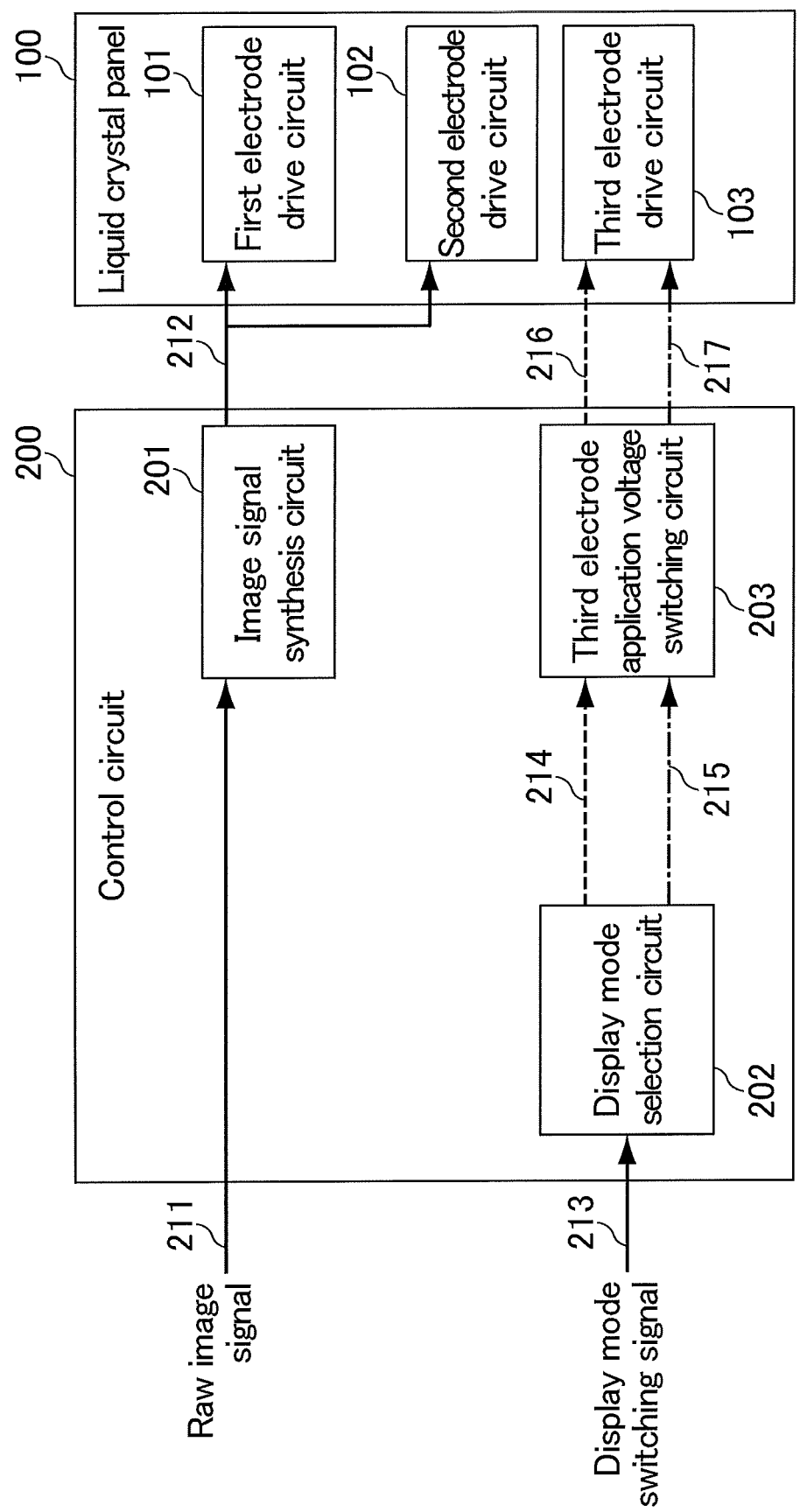
FIG. 9 is a block diagram schematically showing a display method for a first display mode and a second display mode.

FIG. 9 is a block diagram schematically showing a display method for a first display mode and a second display mode. As shown in FIG. 9, the liquid crystal display device according to the embodiment includes the liquid crystal panel 100 and a control circuit 200. The liquid crystal panel 100 may include a first electrode drive circuit 101 that applies voltage to the first electrode 12, a second electrode drive circuit 102 that applies voltage to the second electrodes 14, and a third electrode drive circuit 103 that applies voltage to the third electrode 33. The control circuit 200 may include an image signal synthesis circuit 201 a display mode selection circuit 202, and a third electrode application voltage switching circuit 203. The control circuit 200 switches between application of alternating voltage and application of constant voltage to the third electrode 33.

The image signal synthesis circuit 201, for example, receives a raw image signal 211 for displaying a desired image and outputs an image signal 212 corresponding to the received raw image signal 211 to the first electrode drive circuit 101 and the second electrode drive circuit 102.

The display mode selection circuit 202 receives a display mode switching signal 213 for switching between the first display mode and the second display mode. When the first display mode is selected, the display mode selection circuit 202 outputs a first display mode selection signal 214 to the third electrode application voltage switching circuit 203. When the second display mode is selected, the display mode selection circuit 202 outputs a second display mode selection signal 215 to the third electrode application voltage switching circuit 203.

The third electrode application voltage switching circuit 203 inputs an alternating signal 216 or a constant voltage signal 217 to the electrode drive circuit 103 according to the received display mode selection signal so as to switch between application of alternating voltage and application of constant voltage to the third electrode 33. When receiving a first display mode selection signal 214 from the display mode selection circuit 202, the third electrode application voltage switching circuit 203 outputs an alternating signal 216 to the third electrode drive circuit 103 so as to apply a given magnitude of alternating voltage to the third electrode 33. When receiving a second display mode selection signal 215 from the display mode selection circuit 202, the third electrode application voltage switching circuit 203 outputs a constant voltage signal 217 to the third electrode drive circuit 103 so as to apply a given magnitude of constant voltage to the third electrode 33.

Figure 10:
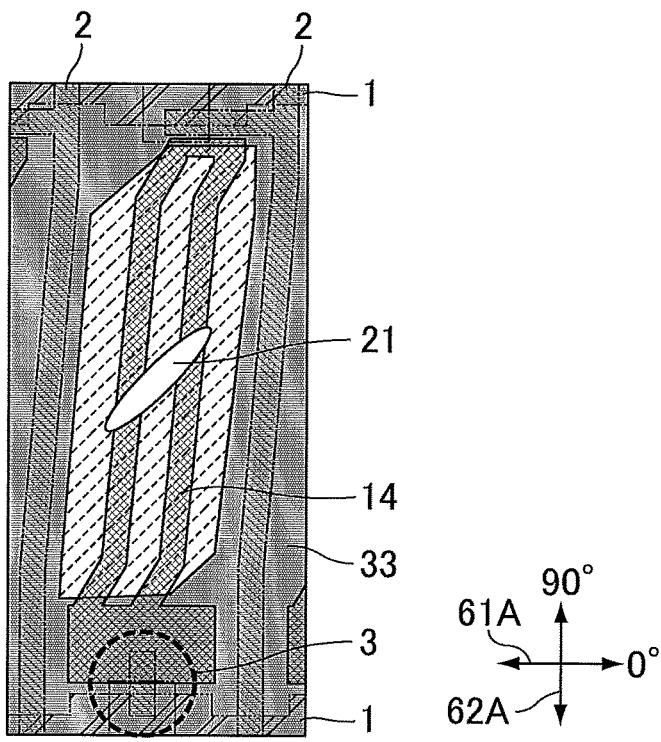
FIG. 10 is a schematic plan view of a sub-pixel in white display in a narrow viewing angle mode.
Figure 11:
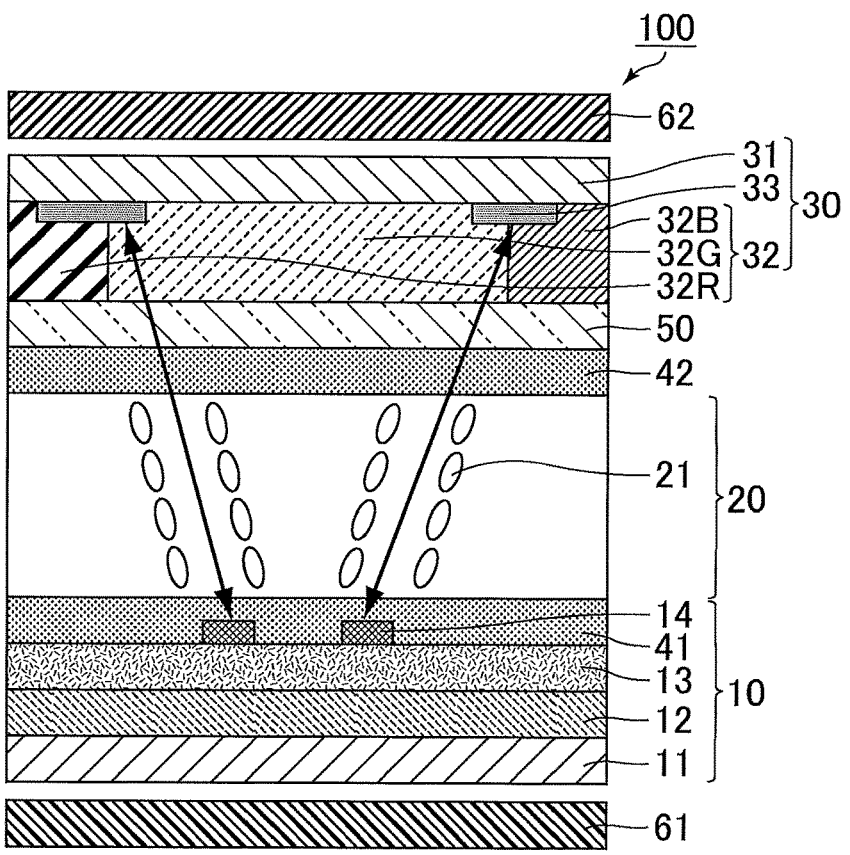
FIG. 11 is a schematic cross-sectional view of a sub-pixel in black display in the narrow viewing angle mode.
Figure 12:
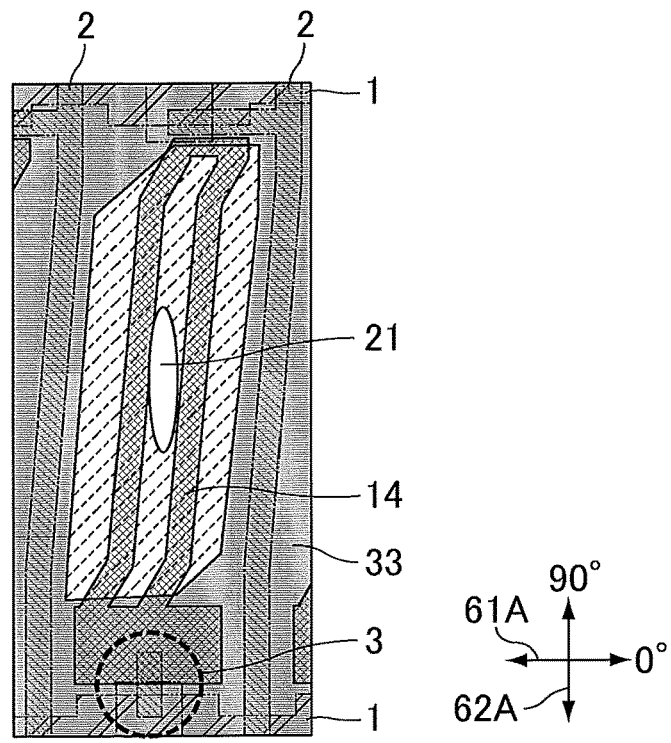
FIG. 12 is a schematic plan view of a sub-pixel in black display in the narrow viewing angle mode.
Figure 13:
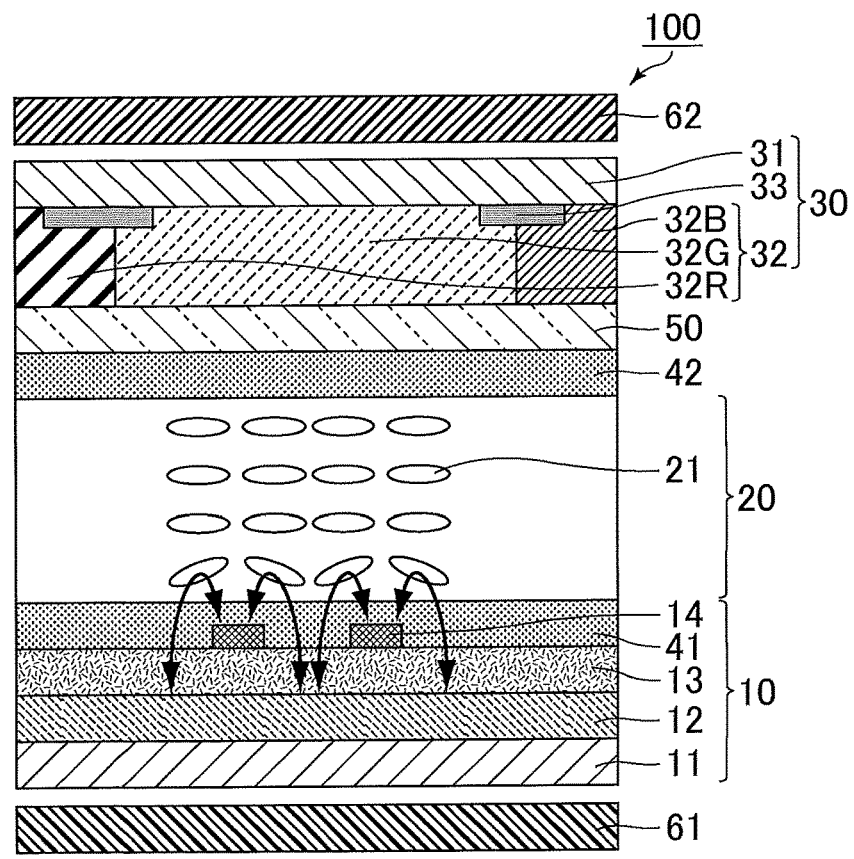
FIG. 13 is a schematic cross-sectional view of a sub-pixel in white display in a wide viewing angle mode.
Figure 14:
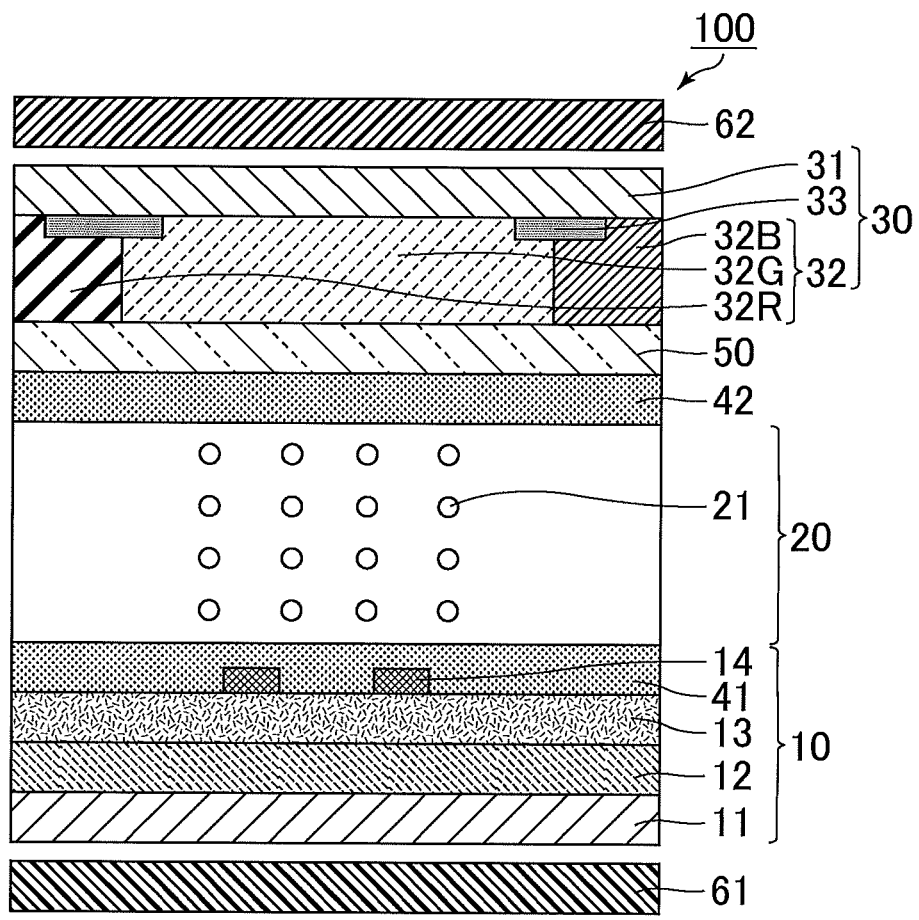
FIG. 14 is a schematic cross-sectional view of a sub-pixel in black display in the wide viewing angle mode.

Hereinafter, the first display mode and the second display mode are described with reference to FIG. 1 and FIGS. 9 to 14. The first display mode is also referred to as a narrow viewing angle mode. The second display mode is also referred to as a wide viewing angle mode. FIG. 1 is also a schematic cross-sectional view of a sub-pixel in white display in the narrow viewing angle mode. FIG. 10 is a schematic plan view of a sub-pixel in white display in the narrow viewing angle mode. FIG. 11 is a schematic cross-sectional view of a sub-pixel in black display in the narrow viewing angle mode. FIG. 12 is a schematic plan view of a sub-pixel in black display in the narrow viewing angle mode. FIG. 13 is a schematic cross-sectional view of a sub-pixel in white display in the wide viewing angle mode. FIG. 14 is a schematic cross-sectional view of a sub-pixel in black display in the wide viewing angle mode. The black display means the display state with the lowest luminance (grayscale value of 0). The white display means the display state with the highest luminance (grayscale value of 255).

The liquid crystal molecules align in the direction horizontal to the active matrix substrate 10 in the non-voltage application state in which no voltage is applied to the liquid crystal layer. The term "horizontal" herein means that the tilt angle (including the pre-tilt angle) of the liquid crystal molecules 21 from the surface of the active matrix substrate 10 or the color filter substrate 30 is 0° to 5°, preferably 0° to 3°, more preferably 0° to 1°. The tilt angle of the liquid crystal molecules means an angle of the major axes of the liquid crystal molecules 21 formed with the surface of the active matrix substrate 10.

In white display in the narrow viewing angle mode, for example, the control circuit applies constant voltage (common voltage) to one of the first electrode 12 or the second electrodes 14, and applies a magnitude of voltage different from the common voltage to the other. The control circuit also applies alternating voltage to the third electrode. The absolute value of the alternating voltage is preferably different from the absolute value of the voltage applied to the first electrode 12 and the second electrodes 14. For example, when common voltage is applied to the second electrodes 14, an alternating voltage whose absolute value relative to the common voltage is 4 V is applied to the first electrode 12, while alternating voltage whose absolute value relative to the common voltage is 6 V is applied to the third electrode 33. Thereby, as shown in FIG. 1, fringe electric fields are formed between the first electrode 12 and the second electrodes 14, and oblique electric fields are formed relative to the thickness direction of the liquid crystal layer 20 between the third electrode 33 and the first electrode 12 and the second electrode 14. As a result, electric fields are synthesized from the fringe electric fields and the oblique electric fields in the liquid crystal layer 20, so that the liquid crystal molecules 21 align at a different azimuth while forming an angle with the active matrix substrate 10 under the influence of electric fields generated by the first electrode 12, the second electrodes 14, and the third electrode 33.

As the liquid crystal molecules 21 rotate in the plane of the liquid crystal layer 20 to align at an azimuth different from the initial alignment azimuth, as shown in FIG. 10, the major axis of each liquid crystal molecule 21 forms angles with the absorption axis 61A of the first polarizer and the absorption axis 62A of the second polarizer. The liquid crystal molecules thereby transmit light from the back surface of the liquid crystal panel, leading to white display. As a result, the first image can be observed in the narrow viewing angle range. Meanwhile, as shown in FIG. 1, the liquid crystal molecules 21 form an angle with the active matrix substrate to cause changes in the image such as an extremely low contrast ratio when the liquid crystal panel is observed in the wide viewing angle range, making the first image difficult to observe.

In black display in the narrow viewing angle mode, for example, the control circuit applies common voltage to the second electrodes 14 and the first electrode 12. The control circuit also applies alternating voltage to the third electrode. The absolute value of the alternating voltage is preferably different from the absolute value of the common voltage. For example, when common voltage is applied to the second electrodes 14 common voltage (voltage whose absolute value relative to the common voltage is 0 V) is applied to the first electrode 12, while alternating voltage whose absolute value relative to the common voltage is 6 V is applied to the third electrode 33. Thereby, as shown in FIG. 11, oblique electric fields are generated between the third electrode 33 and the first electrode 12 and between the third electrode 33 and the second electrodes 14. The liquid crystal molecules 21 under the influence of the oblique electric fields form an angle with the active matrix substrate 10.

As shown in FIG. 12, the alignment azimuth of the liquid crystal molecules 21 do not change in the plane of the liquid crystal layer 20, so that the liquid crystal molecules do not transmit light from the back surface of the liquid crystal panel, leading to black display. As shown in FIG. 11, the liquid crystal molecules 21 form an angle with the active matrix substrate 21. Thus, the display appears whiter when the liquid crystal panel is observed in the wide viewing angle range than the black display observed in the narrow viewing angle range.

In white display in the wide viewing angle mode, for example, the control circuit applies constant voltage (common voltage) to one of the first electrode 12 or the second electrodes 14, and applies a magnitude of voltage different from the common voltage to the other. The control circuit also applies constant voltage (common voltage) common to the first electrode 12 or the second electrodes 14 to the third electrode 33. For example, when common voltage is applied to the second electrodes 14, an alternating voltage whose absolute value relative to the common voltage is 4 V is applied to the first electrode 12, while the common voltage common to the first electrode 12 is applied to the third electrode 33. Thereby, as shown in FIG. 13, fringe electric fields are formed between the first electrode 12 and the second electrodes 14. In contrast, differently from the narrow viewing angle mode, the electric fields in the thickness direction of the liquid crystal layer 20 are small. Thus, the liquid crystal molecules 21 under the influence of the electric fields formed between the first electrode 12 and the second electrodes 14 align at a different azimuth while aligning parallel to the active matrix substrate 10. The schematic plan view of a sub-pixel in white display in the wide viewing angle mode is the same as FIG. 10, and thus descriptions therefor are omitted here.

In black display in the wide viewing angle mode, for example, the control circuit applies common voltage to the second electrodes 14 and the first electrode 12. The control circuit also applies constant voltage common to the first electrode 12 or the second electrodes 14 to the third electrode. As shown in FIG. 14, no electric field is generated in the liquid crystal layer 20, so that the liquid crystal molecules 21 align at the initial alignment azimuth. The initial alignment azimuth is preferably parallel to the active matrix substrate 10 and parallel to the absorption axis 61A of the first polarizer 61 or the absorption axis 62A of the second polarizer 62 in a plan view. The schematic cross-sectional view of a sub-pixel in black display in the wide viewing angle mode is the same as FIG. 12, and thus descriptions therefor are omitted here.

The white display in the narrow viewing angle mode and the white display in the wide viewing angle mode can be switched by application of voltage to the third electrode. Likewise, black display in the narrow viewing angle mode and black display in the wide viewing angle mode can be switched by application of voltage to the third electrode. The same applies to intermediate display. The narrow viewing angle mode and the wide viewing angle mode can be switched by application and non-application of alternating voltage to the third electrode.

The liquid crystal display device according to the embodiment switches the mode from the second display mode (wide viewing angle mode) to the first display mode (narrow viewing angle mode) as described above to ensure high privacy by making its liquid crystal panel less observable from the left-right directions. Furthermore, the liquid crystal display device according to the embodiment makes its liquid crystal panel less observable from the left-right and oblique directions to ensure even higher privacy by incorporating the later-described soft veil-view function in addition to the display mode switching. The first display mode alone can lead to the narrow viewing angle effect at the left-right azimuths and, although limitative, can also lead to the effect at an oblique azimuth of 45 degrees. Conversely, the soft veil-view function as described in JP 2011-253206 A alone can lead to the narrow viewing angle effect at an oblique azimuth of 45 degrees, but the narrow viewing angle effect is limitative at the left-right azimuths. Thus, combining these functions achieves a complementary effect, leading to an excellent narrow viewing angle effect at the left-right and 45 degrees azimuths. An invention based on this finding is described below.

The "up-down directions" refer to the 90° and 270° azimuths, with the right direction of the liquid crystal panel on which the desired image is displayed being 0° and the angle increasing counterclockwise. The "left-right directions" refer to 0° and 180° azimuths. The "oblique azimuth" refers to 45°, 135°, 225°, or 315° azimuth.

Figure 15:
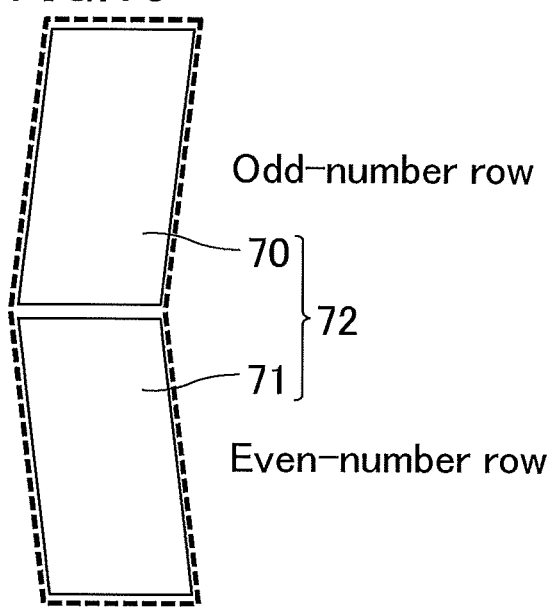
FIG. 15 is a schematic plan view showing an exemplary display unit in a liquid crystal panel.
Figure 16:
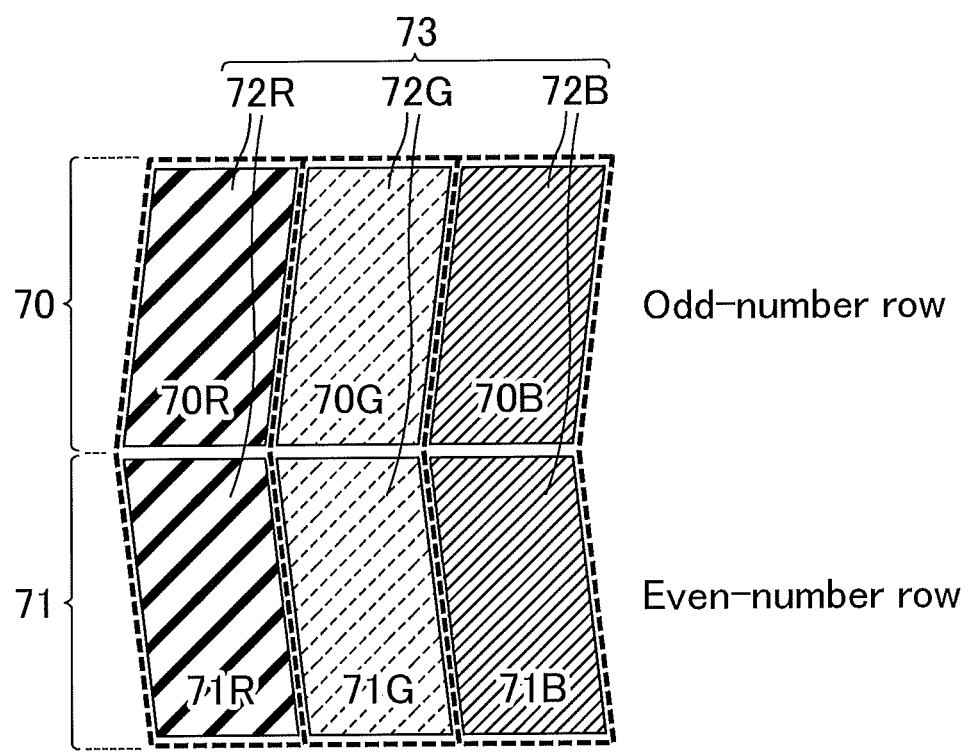
FIG. 16 is a schematic plan view showing an exemplary color element for color display using a soft veil-view function.

Hereinafter, an exemplary method of displaying an image using the soft veil-view function is described with reference to FIG. 15 to FIG. 20. FIG. 15 to FIG. 20 schematically show the sub-pixel 70 shown in the drawings including FIG. 1. FIG. 15 is a schematic plan view showing an exemplary display unit in a liquid crystal panel. FIG. 16 is a schematic plan view showing an exemplary color element for color display using the soft veil-view function.

As shown in FIG. 15, the liquid crystal panel 100 includes display units 72 for displaying an image using the soft veil-view function. The display units 72 each include a pair of sub-pixels arranged adjacent to each other, one of the sub-pixels being a first sub-pixel 70 selected from an odd-number row and the other being a second sub-pixel 71 selected from an even-number row. The first pixel 70 and the second pixel 71 may each be considered as one sub-pixel as shown in FIG. 1, or a combination of a first red sub-pixel 70R, a first green sub-pixel 70G, and a first blue sub-pixel 70B may be regarded as the first pixel 70 and a combination of a second red sub-pixel 71R, a second green sub-pixel 71G, and a second blue sub-pixel 71B may be regarded as the second pixel 71. For color display by an ordinary display method, the pixels including red, green, and blue pixels are independently driven. In the ordinary color display, the display can be at a resolution twice that of the color display using the soft veil-view function.

For color display, the liquid crystal panel 100 preferably includes a red display unit 72R including a first red sub-pixel 70R and a second red sub-pixel 71R, a green display unit 72G including a first green sub-pixel 70G and a second green sub-pixel 71G, and a blue display unit 72B including a first blue sub-pixel 70B and a second blue sub-pixel 71B. The first red sub-pixel 70R and the second red sub-pixel 71R are each superimposed with a red color filter 32R in an optical opening. The first green sub-pixel 70G and the second green sub-pixel 71G are each superimposed with a green color filter 32G in an optical opening. The first blue sub-pixel 70B and the second blue sub-pixel 71B are each superimposed with a blue color filter 32B in an optical opening.

An image can be displayed using the soft veil-view function by, for example, dividing the luminance data value of the raw image desired to be displayed as a first image, D1, into two equivalent data values D2 and D3, inputting the data value of D1+D2 to the first sub-pixel 70 or the second sub-pixel 71, and inputting the data value of D1−D3 to the other. When the liquid crystal panel is observed in the narrow viewing angle range, the luminance of the first sub-pixel 70 and the luminance of the second sub-pixel 71 are spatially averaged to be recognized as the luminance of the raw image. Meanwhile, when the panel is observed in the wide viewing angle range, the luminances are recognized as the luminance D1+D2 or the luminance D1−D3.

Figure 17:
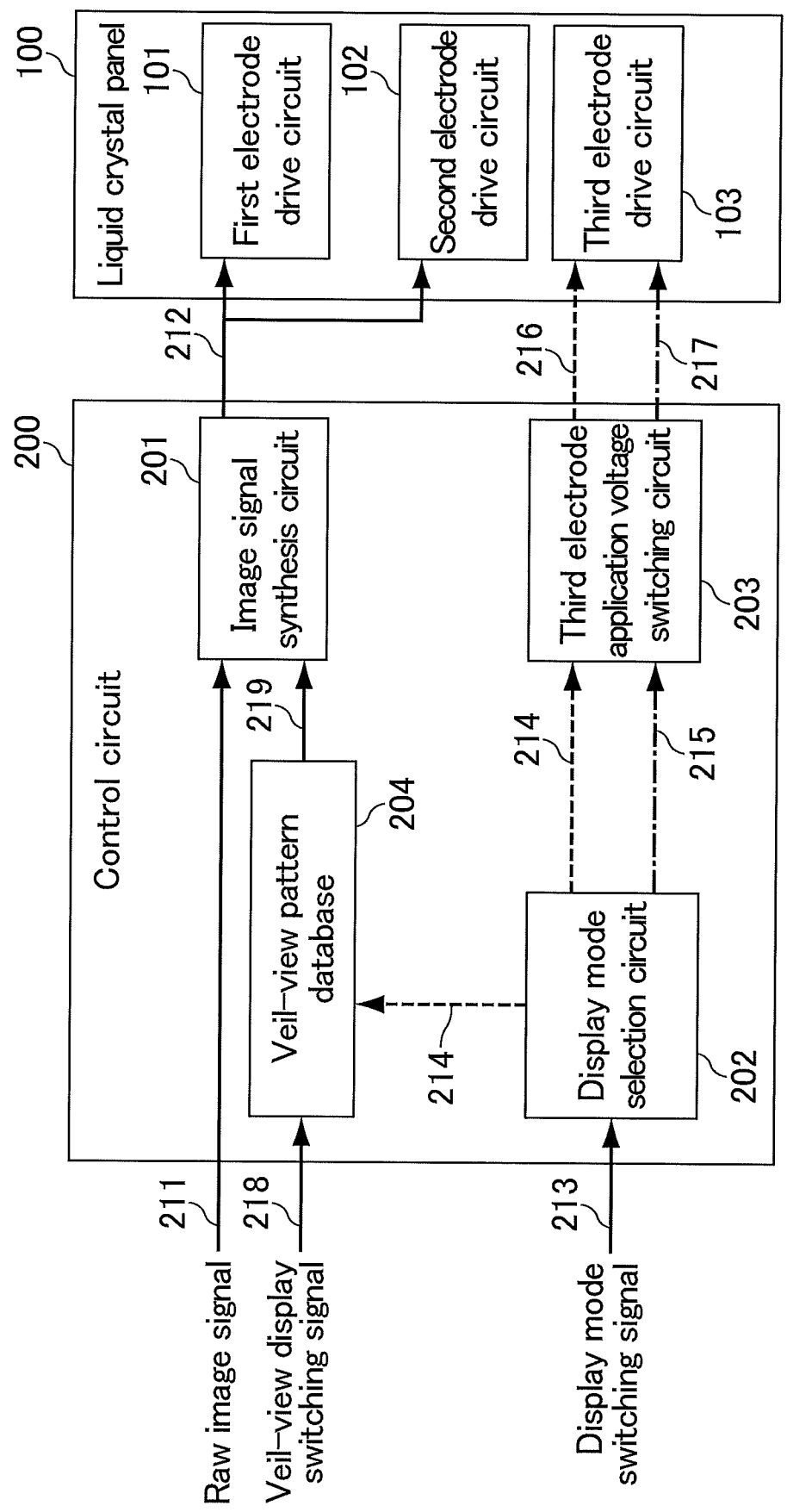
FIG. 17 is a block diagram schematically showing a method for displaying a soft veil-view pattern.

Hereinafter, the method of displaying a soft veil-view pattern is described with reference to FIG. 17. FIG. 17 is a block diagram schematically showing a method for displaying a soft veil-view pattern. The control circuit 200 in the first display mode inputs different image signals to the first sub-pixel and the second sub-pixel such that a second image different from the first image is observed in the wide viewing angle range. Such a display method is also referred to as the soft veil-view function. Display using the soft veil-view function can enhance the privacy when combined with the first display mode (narrow viewing angle mode). Thus, when receiving a first display mode selection signal 214 from the display mode selection circuit 202, a database 204 preferably outputs a soft veil-view pattern image signal 219 to the image signal synthesis circuit 201.

As shown in FIG. 17, the control circuit 200 may further include the database 204 in which information related to the soft veil-view patterns is stored. When receiving a soft veil-view display switching signal 218, the database 204 outputs a soft veil-view image signal 219 to the image signal synthesis circuit 201. The image signal synthesis circuit 201 outputs an image signal 212 formed by synthesis of the raw image signal 211 and the soft veil-view image signal 219 to the first electrode drive circuit 101 and the second electrode drive circuit 102.

For example, when the second electrode drive circuit 102 applies common voltage to the second electrodes 14, the first electrode drive circuit 101 applies different magnitudes of voltage to the first electrode(s) 12 corresponding to the first sub-pixel 70 and the second sub-pixel 71 such that the second image is observed in the wide viewing angle range. In this case, one first electrode 12 is preferably provided in each sub-pixel. When the first electrode drive circuit 101 applies common voltage to the first electrode 12, the second electrode drive circuit 102 applies different magnitudes of voltage to the second electrodes 14 corresponding to the first sub-pixel 70 and the second sub-pixel 71 such that the second image is observed in the wide viewing angle range.

Figure 18:
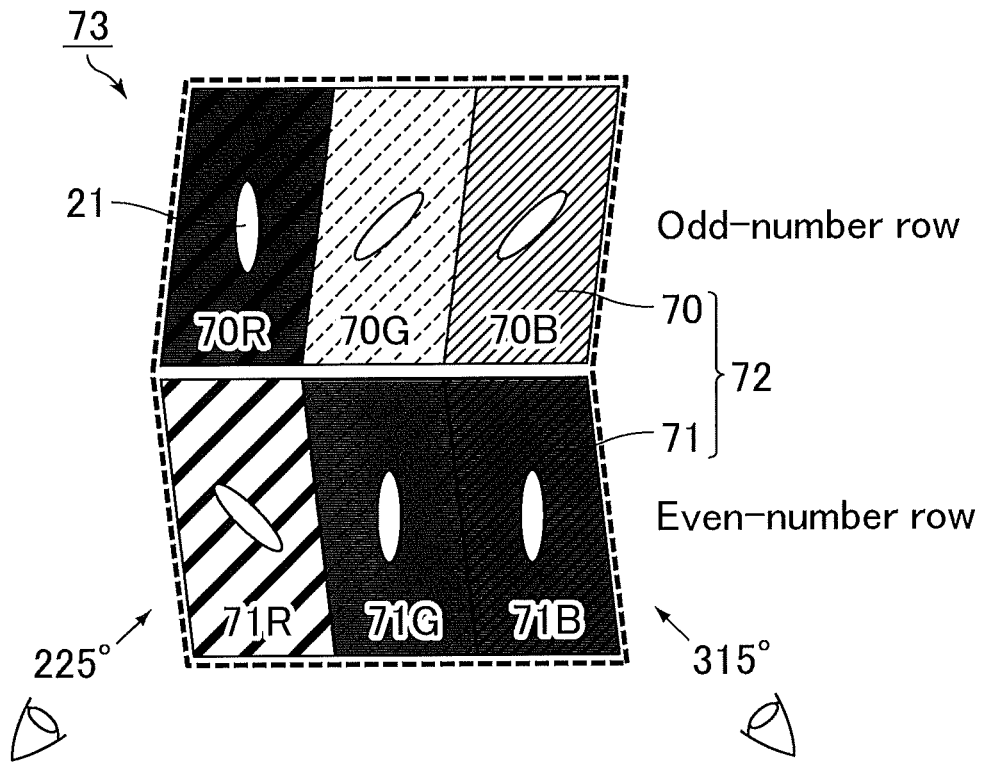
FIG. 18 is a schematic plan view showing an exemplary display pattern for color elements.
Figure 19:
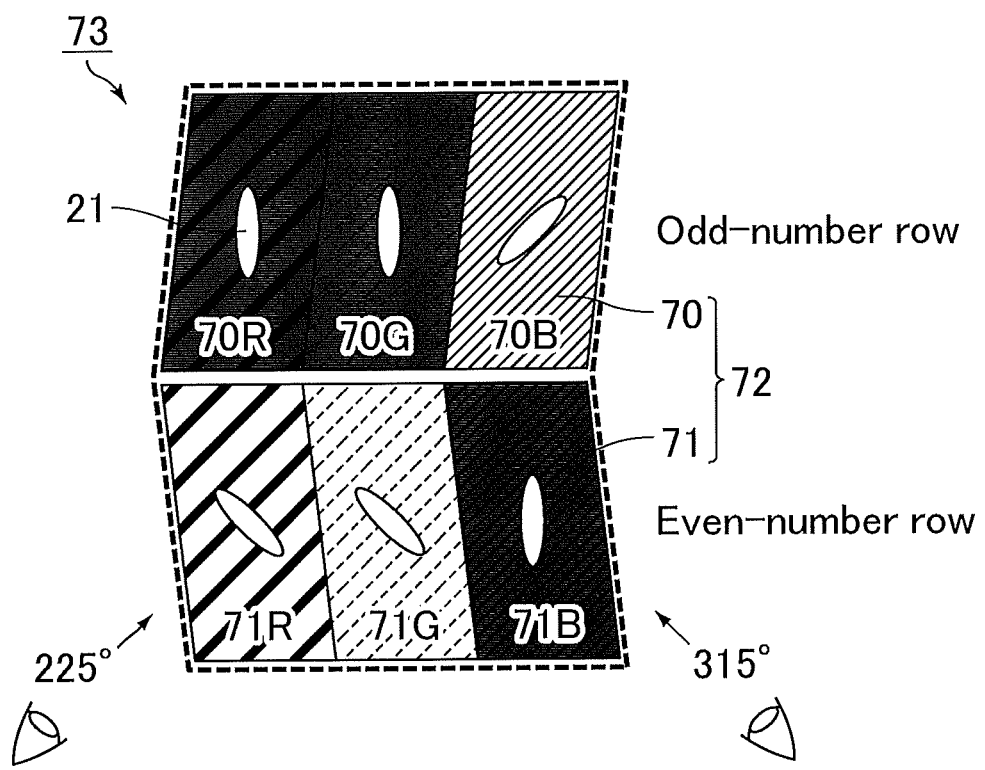
FIG. 19 is a schematic plan view showing another exemplary display pattern for color elements.

FIG. 18 is a schematic plan view showing an exemplary display pattern for color elements. FIG. 19 is a schematic plan view showing another exemplary display pattern for color elements. A row in which a first sub-pixel 70 is arranged is also referred to as an odd-number row. A row in which a second sub-pixel 71 is arranged is also referred to as an even-number row. As shown in FIG. 18, when the first red sub-pixel 70R, the second green sub-pixel 71G, and the second blue sub-pixel 71B are displayed in black and the second red sub-pixel 71R, the first green sub-pixel 70G, and the first blue sub-pixel 70B are displayed in white, the liquid crystal molecules present in the second red sub-pixel 71R in observation at an azimuth of 225° are observed from the direction of the minor axes of the liquid crystal molecules in which the retardation is high, and thus a red color is observed. In contrast, the liquid crystal molecules in the first green sub-pixel 70G and the first blue sub-pixel 70B are observed from the direction of the major axes of the liquid crystal molecules in which the retardation is low, so that the corresponding colors are not observed. As a result, the red color is perceived. Meanwhile, in observation at an azimuth of 315°, the liquid crystal molecules in the first green sub-pixel 70G and the first blue sub-pixel 70B are observed from the direction of the minor axes of the liquid crystal molecules, so that a cyan color, which is a mixture of blue and green colors, is perceived. Here, the liquid crystal molecules in the second red sub-pixel 71R are observed from the direction of the major axes of the liquid crystal molecules, so that the corresponding color is not observed. As a result, the cyan color is perceived. As shown in FIG. 19, when the first red sub-pixel 70R, the first green sub-pixel 70G, and the second blue sub-pixel 71B are displayed in black and the second red sub-pixel 71R, the second green sub-pixel 71G, and the first blue sub-pixel 70B are displayed in white, observation at an azimuth of 225° results in perception of a yellow color, which is a mixture of red and green colors, and observation at an azimuth of 315° results in perception of a blue color.

Figure 20:
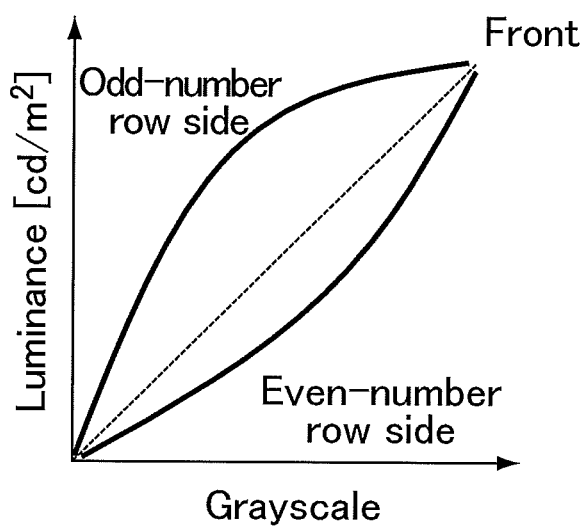
FIG. 20 is an example of y curves of a liquid crystal panel.

When the display pattern of the color elements shown in FIG. 18 and the display pattern of color elements in FIG. 19 are combined, observation from the direction normal to the liquid crystal panel (from the front) results in observation of white display. FIG. 20 is an example of y curves of a liquid crystal panel. As shown in FIG. 20, in the range of intermediate values, the difference in contrast ratio between an image formed by sub-pixels on the odd-number row side and an image formed by sub-pixels on the even-number row side is large in observation from a certain direction. A soft veil-view pattern is preferably formed in such an intermediate value range in which a sufficient difference in perception between the odd-number rows and even-number rows can be achieved.

The liquid crystal display device according to the embodiment, including the third electrode 33, generates oblique electric fields between the third electrode 33 and at least one of the first electrode 12 or the second electrode 14 in the intermediate display, so that the liquid crystal molecules form an angle with the active matrix substrate 10. The liquid crystal display device therefore can achieve a sufficient difference in perception on the y curves in observation from not only the oblique directions but also the left-right directions, providing the soft veil-view pattern also in the left-right directions.

The second image is preferably a soft veil-view pattern. The soft veil-view pattern is a display image that is to be superimposed with the first image to make the first image less perceivable. Displaying the soft veil-view pattern further enhances the privacy. The soft veil-view pattern is not limited, and may be a geometric pattern such as a striped pattern or a checkered pattern, characters, or an image.

Figure 21:
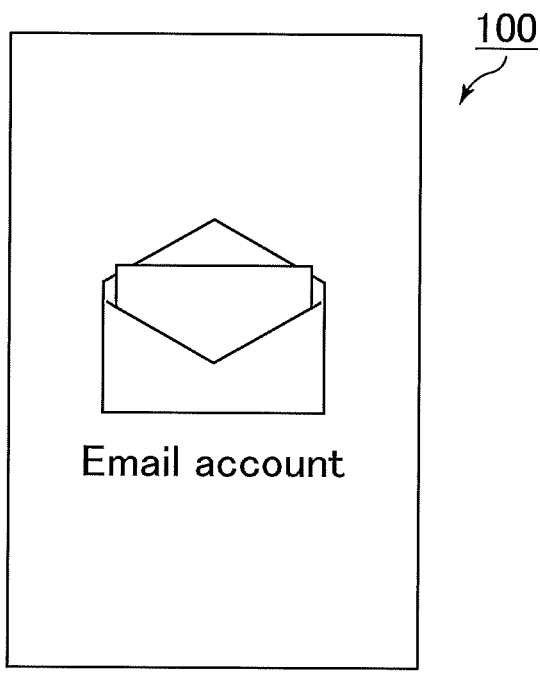
FIG. 21 is a schematic view of a display screen of a liquid crystal panel observed from the normal direction.
Figure 22:
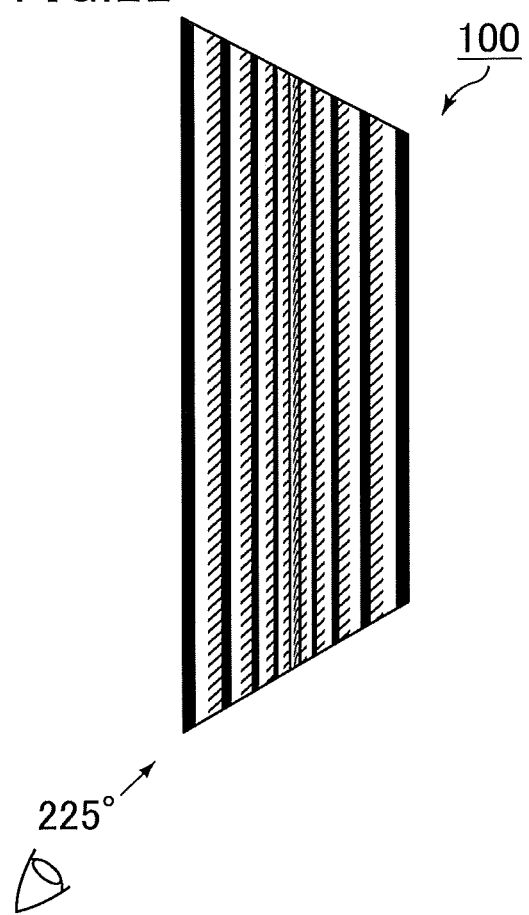
FIG. 22 is a schematic view of a display screen of a liquid crystal panel observed at an azimuth of 225°.
Figure 23:
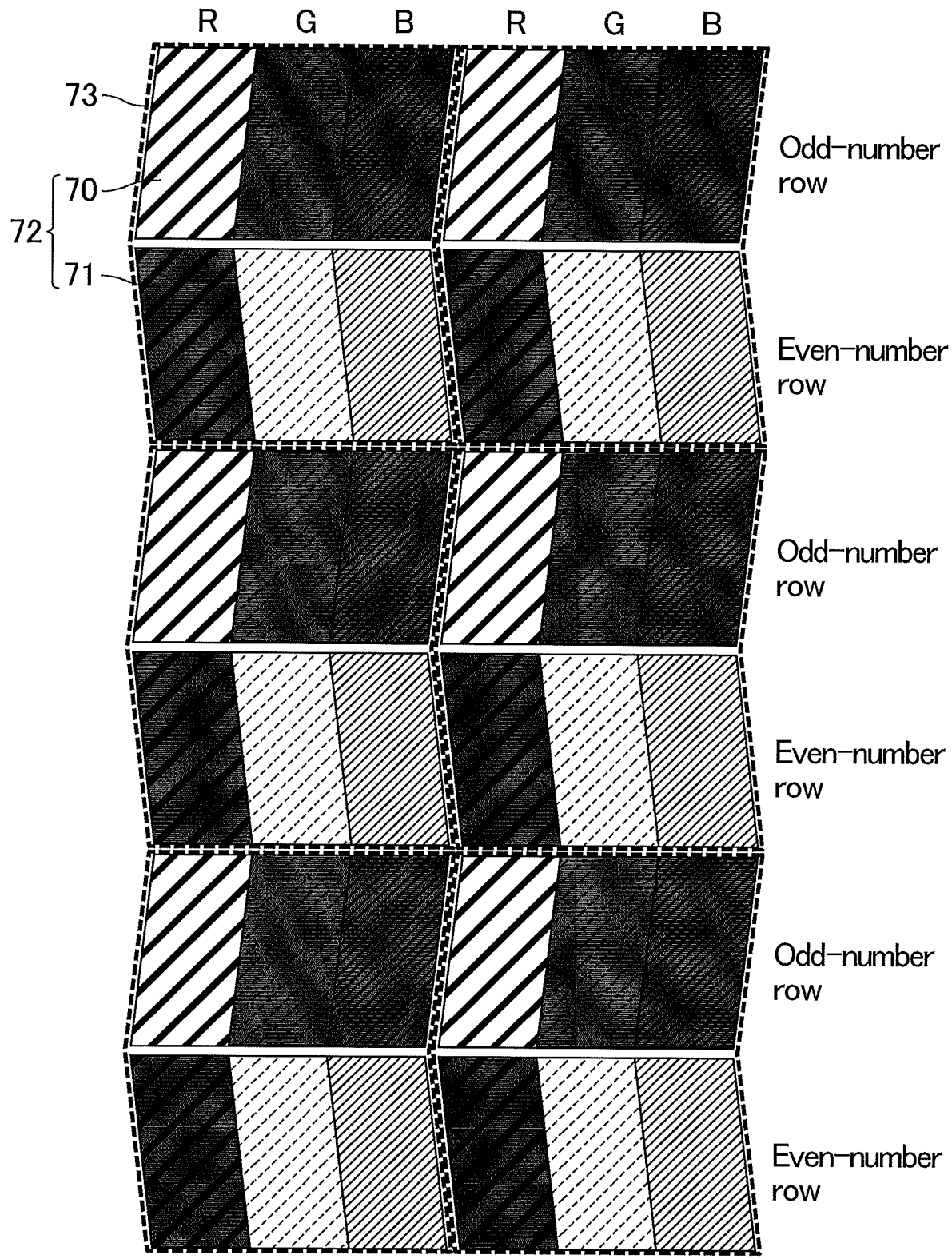
FIG. 23 is a schematic plan view of a liquid crystal panel showing arrangement of color elements for displaying cyan stripes.
Figure 24:
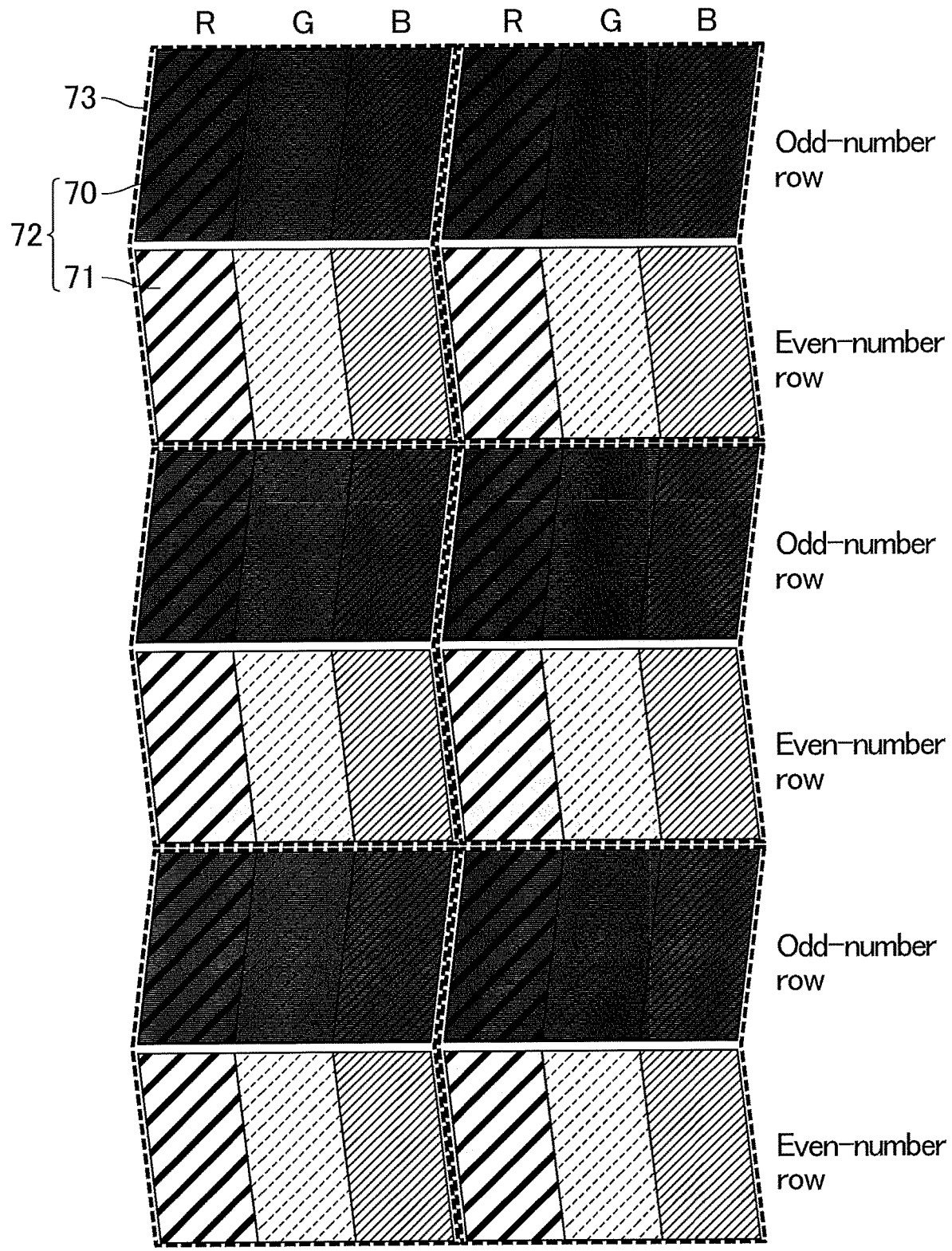
FIG. 24 is a schematic plan view of a liquid crystal panel showing arrangement of color elements for displaying white stripes.
Figure 25:
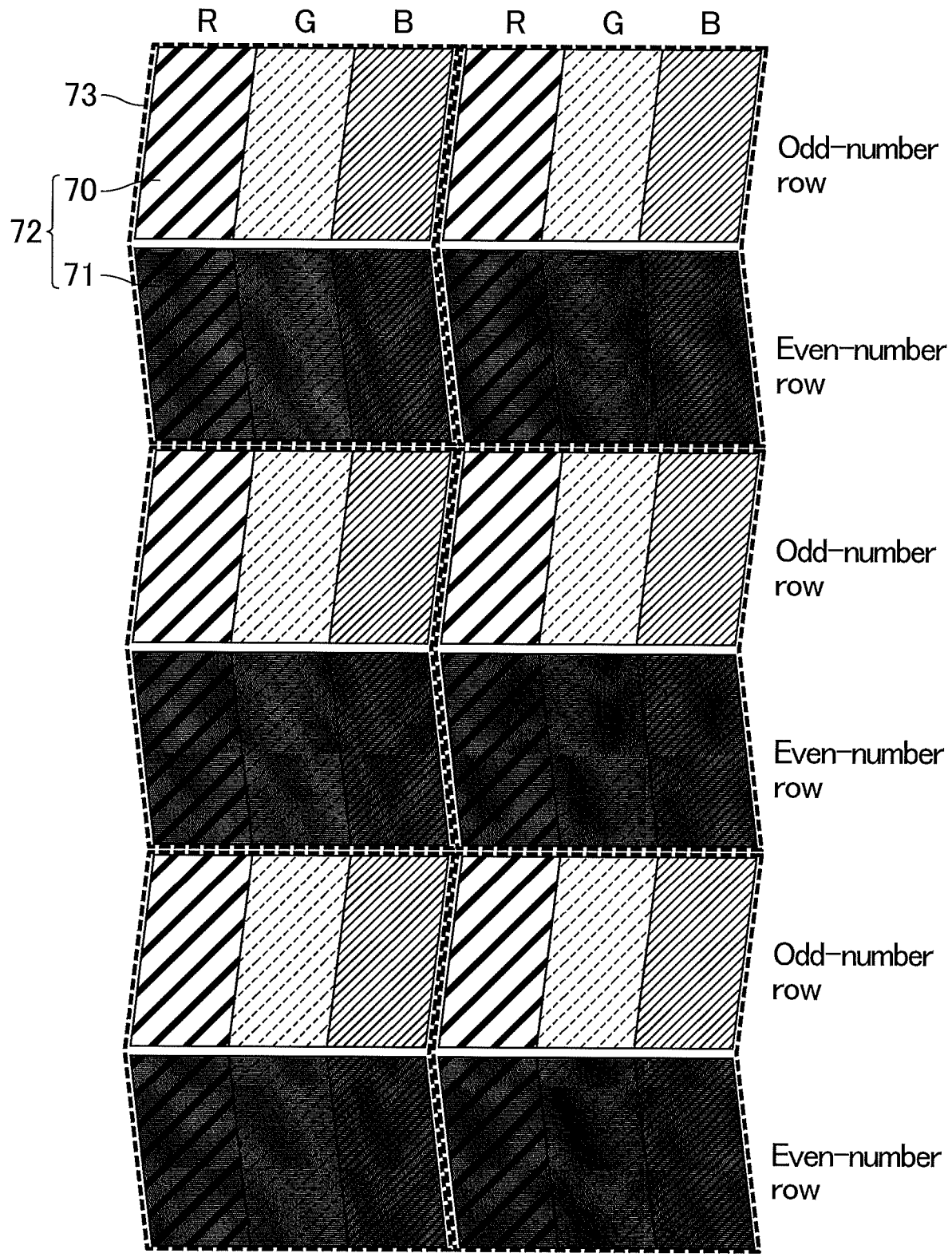
FIG. 25 is a schematic plan view of a liquid crystal panel showing arrangement of color elements for displaying black stripes.

A specific example of the soft veil-view pattern is described below with reference to FIG. 21 to FIG. 25. FIG. 23 to FIG. 25 schematically show the sub-pixel 70 shown in the drawings including FIG. 1. FIG. 21 is a schematic view of a display screen of a liquid crystal panel observed from the normal direction. FIG. 22 is a schematic view of a display screen of a liquid crystal panel observed at an azimuth of 225°. When the display screen of the liquid crystal panel is observed from the normal direction, an envelope image and the characters "Email account" are perceived as the first image as shown in FIG. 21. When the display screen of the liquid crystal panel is observed at an azimuth of 225°, a striped pattern as shown in FIG. 22 is perceived as the soft veil-view pattern on the first image. This makes the first image less perceivable from oblique directions, enhancing the privacy.

The striped pattern is perceived as, for example, stripes of cyan, white, and black in observation at an azimuth of 225° and stripes of red, black, and white in observation at an azimuth of 315°.

FIG. 23 is a schematic plan view of a liquid crystal panel showing arrangement of color elements for displaying cyan stripes. As shown in FIG. 23, color elements 73 are arranged in the row and column directions of the liquid crystal panel, with the first red sub-pixels 70R, the second green sub-pixels 71G, and the second blue sub-pixels 71B displayed normally and the second red sub-pixels 71R, the first green sub-pixels 70G, and the first blue sub-pixels 70B displayed in black. With this arrangement, the liquid crystal display device can display cyan stripes as the second image in observation at an azimuth of 225° and red stripes as the second image in observation at an azimuth of 315°. The normal display is display for the first image.

FIG. 24 is a schematic plan view of a liquid crystal panel showing arrangement of color elements for displaying white stripes. For white stripes, as shown in FIG. 24, the color elements 73 are arranged in the row and column directions of the liquid crystal panel, with the first red sub-pixels 70R, the first green sub-pixels 70G, and the first blue sub-pixels 70B displayed in black and the second red sub-pixels 71R, the second green sub-pixels 71G, and the second blue sub-pixels 71B displayed normally. With this arrangement, the liquid crystal display device can display white stripes in observation at an azimuth of 225° and black stripes in observation at an azimuth of 315°.

FIG. 25 is a schematic plan view of a liquid crystal panel showing arrangement of color elements for displaying black stripes. For black stripes, as shown in FIG. 25, the color elements 73 are arranged in the row and column directions of the liquid crystal panel, with the first red sub-pixels 70R, the first green sub-pixels 70G, and the first blue sub-pixels 70B displayed normally and the second red sub-pixels 71R, the second green sub-pixels 71G, and the second blue sub-pixels 71B displayed in black. With this arrangement, the liquid crystal display device can display black stripes in observation at an azimuth of 225° and white stripes in observation at an azimuth of 315°.

Hereinafter, the effects of the present invention are described based on examples and comparative examples. The examples, however, are not intended to limit the scope of the present invention.

Example 1

A liquid crystal display device according to Example 1 has the structure shown in FIG. 1 and FIG. 2. The active matrix substrate has an FFS electrode structure. A solid electrode formed from ITO was used as the first electrode. A silicon nitride film having a thickness of 110 μm was used as the insulating layer. One ITO electrode was arranged in each sub-pixel as a second electrode. Each second electrode was provided with an opening. The liquid crystal molecules used were a positive liquid crystal material.

The color filter substrate included a second substrate, a third electrode, and color filters, which are dielectric layers, in the stated order. A dielectric layer having a thickness of 2 μm (overcoat layer) was arranged on the color filters. The third electrode was a single-layer light shielding electrode formed from molybdenum, and was arranged to surround the optical openings of the sub-pixels. In Example 1, the third electrode is also referred to as a counter electrode.

Comparative Example 1

A liquid crystal display device according to Comparative Example 1 has the same structure as that in Example 1 except that a planar ITO electrode covering the entire second substrate was used as the counter electrode instead of the third electrode. In other words, the color filter substrate in Comparative Example 1 includes a second substrate, color filters, a first overcoat layer, a third electrode, and a second overcoat layer in the stated order.

Comparative Example 2

A liquid crystal display device according to Comparative Example 2 has the same structure as that in Example 1 except that a planar ITO electrode covering the entire second substrate was used as the counter electrode instead of the third electrode and no dielectric layer was arranged on the color filters.

<Comparison of Contrast Ratios>

The luminance in black display (grayscale value of 0) and the luminance in white display (grayscale value of 255) of each of the liquid crystal display devices according to Example 1 and Comparative Examples 1 and 2 in observation from the direction normal to the display screen were measured. The luminance was measured using "SR-UL1R" available from Topcon Technohouse Corp.

The luminance in white display (grayscale value of 255) was measured for each voltage increment of 0.5 V or 1 V by applying common voltage to the second electrode, and increasing the voltage applied to the counter electrode (also referred to as counter voltage) relative to the common voltage from 0 V to 6 V while applying an alternating voltage relative to the common voltage of 4 V to the first electrode. The luminance in black display (grayscale of 0) was measured for each voltage increment of 0.5 V or 1 V by applying common voltage to the second electrode and the first electrode and, in this state, increasing the counter voltage relative to the common voltage from 0 V to 6 V.

The contrast ratio (CR) of each of the liquid crystal display devices according to Example 1 and Comparative Examples 1 and 2 was calculated from the following formula (1) at every counter voltage, and the front contrast ratios were compared.

$$CR = \text{luminance in white display(grayscale of 255)} / \text{luminance in black display(grayscale of 0)} \quad (1)$$

Figure 26:
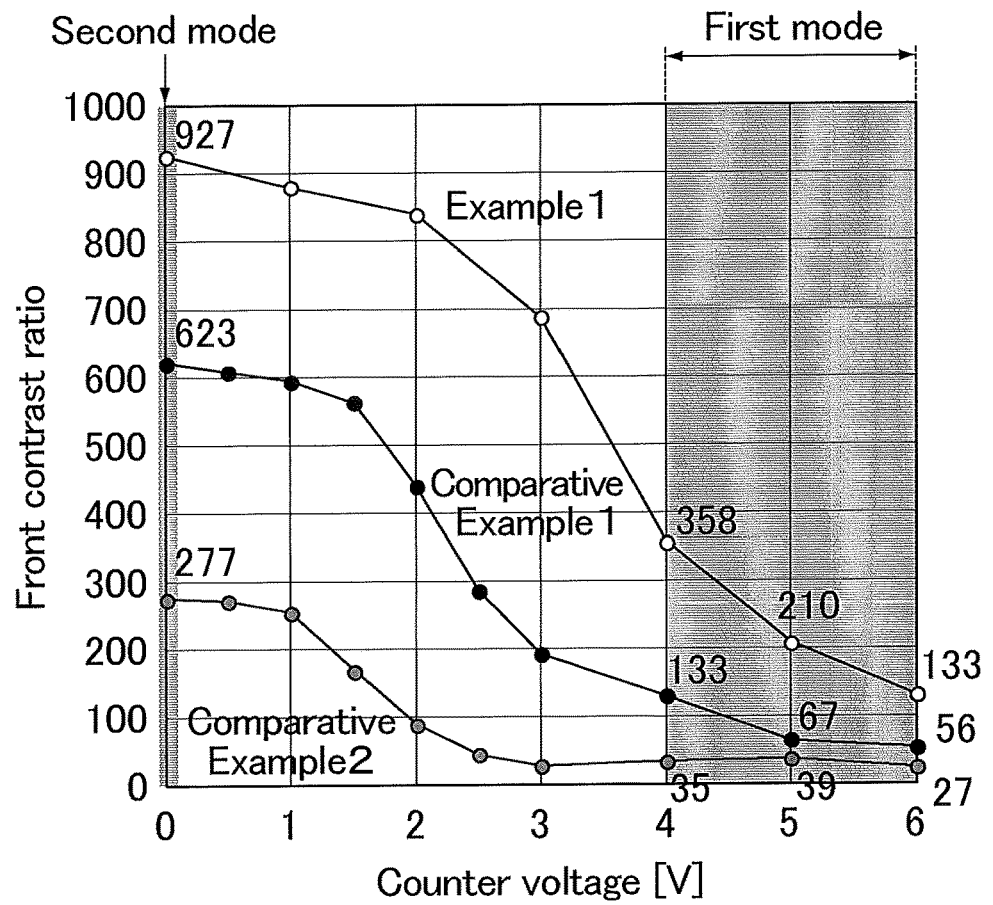
FIG. 26 is a graph comparing front contrast ratios of liquid crystal display devices.

FIG. 26 is a graph comparing front contrast ratios of liquid crystal display devices. A counter voltage of 0 V corresponds to the wide viewing angle mode and counter voltages of 4 to 6 correspond to the narrow viewing angle mode. With a target CR of 1000 in the wide viewing angle mode, as shown in FIG. 26, the CR at a counter voltage of 0 V was 927 (actual value) in Example 1, which was close to the target value. Meanwhile, the CR in Comparative Example 1 was 623 (actual value) and the CR in Comparative Example 2 was 277 (actual value) in the wide viewing angle mode. In Comparative Example 1, the second overcoat layer (dielectric layer) functions as a layer reducing vertical electric fields between the electrodes on the active matrix substrate side and the counter electrode in the wide viewing angle mode in which the counter voltage was 0 V. This probably increased the front CR as compared with Comparative Example 2 in which no second overcoat layer was formed.

<Chromatic Parallax Consideration>

In Example 1, the color filter substrate includes the second substrate, the third electrode, the color filters, and the overcoat layer stacked in the stated order. In order to weaken the electric field between the third electrode and the first electrode or the second electrodes, the total thickness of the color filter layer and the overcoat layer required is 4 µm, for example. A thickness of the color filter layer of 3 µm hardly causes chromatic parallax in observation of the liquid crystal panel from an oblique direction because the thickness of the overcoat layer is only 1 µm, meaning that the distance from the surface of the color filter layer to the liquid crystal layer is merely 1 µm. In contrast, in Comparative Example 1, the first overcoat layer, the counter electrode, and the second overcoat layer are stacked on the color filters. Since the distance required between the counter electrode and the liquid crystal layer in order to weaken the electric fields is 4 µm, for example, the thickness of the second overcoat layer is 4 µm. Thus, the distance from the surface of the color filter layer to the liquid crystal layer is the thickness of the second overcoat layer, 4 µm, plus the thickness of the first overcoat layer, 1 µm, for example, which is 5 µm. As a result, chromatic parallax was observed in observation of the liquid crystal panel from an oblique direction.

<Consideration on Mode Efficiency and CR in Wide Viewing Angle Mode>

The mode efficiencies in the wide viewing angle mode of the liquid crystal display devices according to Example 1 and Comparative Example 1 were compared by the following method. The mode efficiency is represented by the following formula (2).

Mode efficiency (%)=(maximum luminance in crossed Nicols)/(luminance in parallel Nicols)× 100 (2)

Here, the maximum luminance in crossed Nicols is the maximum luminance when a pair of polarizers is arranged in crossed Nicols relative to the liquid crystal panel at a counter voltage of 0 V. The luminance in parallel Nicols is the luminance in the non-voltage application state when a pair of polarizers is arranged in parallel Nicols relative to the liquid crystal panel. The luminance of each liquid crystal display device was estimated using an LCDMaster 3D (Shintech, Inc.) by arranging the liquid crystal display device on a white light source. In addition, the front CR in the wide viewing angle mode of each of the liquid crystal display devices according to Example 1 and Comparative Example 1 was calculated. In calculation of the front CR, the value was about 1000 in Example 1 and about 700 in Comparative Example 1, meaning that the contrast ratios close to the CR (actual value)=927 in Example 1 and CR (actual value)=623 in Comparative Example 1 described above were achieved.

Figure 27:
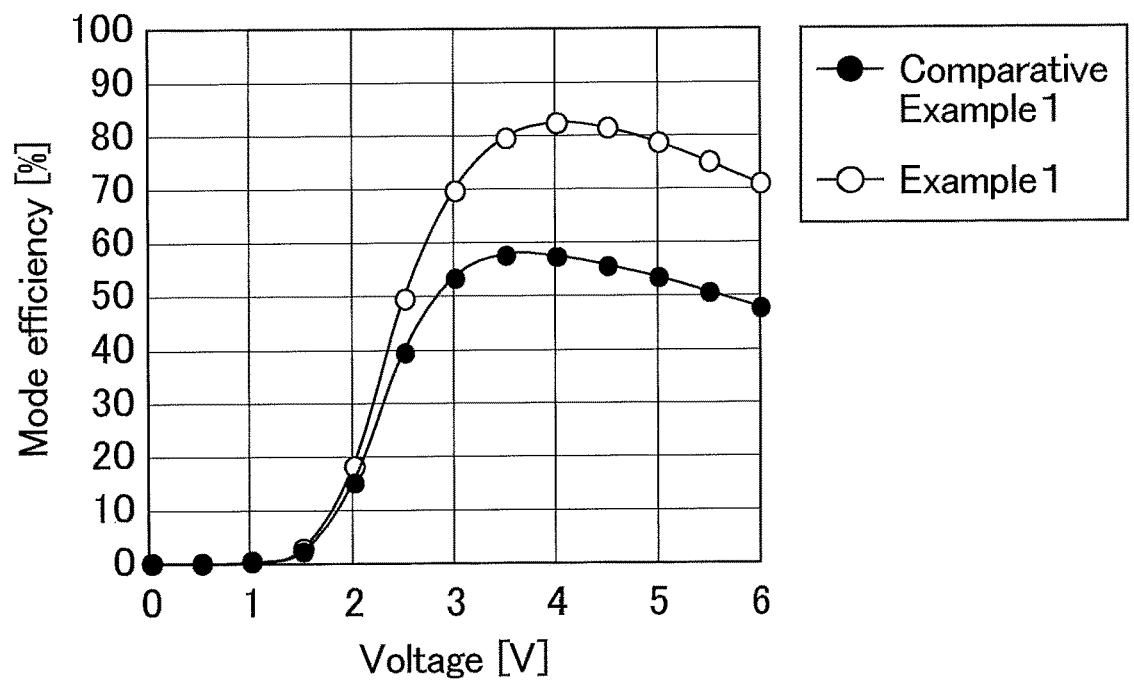
FIG. 27 is a graph showing mode efficiencies in the wide viewing angle mode.

FIG. 27 is a graph showing mode efficiencies in the wide viewing angle mode. As shown in FIG. 27, the highest mode efficiency in Comparative Example 1 was 58%, while the highest mode efficiency in Example 1 was 82%.

In Example 1, the third electrode 33 includes a portion not arranged in the opening of each sub-pixel superimposed with a color filter 32. Thus, the vertical electric fields hardly affect liquid crystal molecules in the opening of the sub-pixel in white display in the wide viewing angle mode. This is probably the reason the transmittance and the contrast ratio were higher than those in Comparative Examples 1 and 2 in which the counter electrode was a solid electrode.

Figure 28:
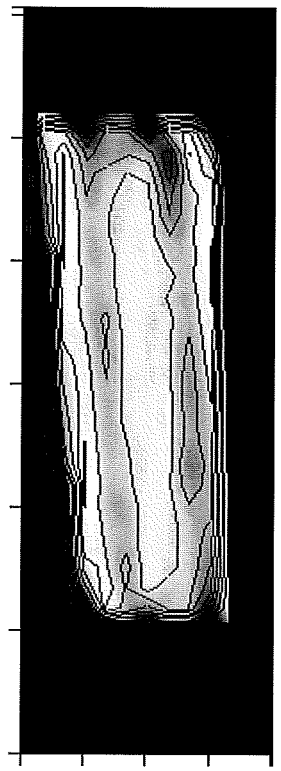
FIG. 28 is a simulation diagram of a sub-pixel in the wide viewing angle mode of a liquid crystal display device according to Example 1.
Figure 29:
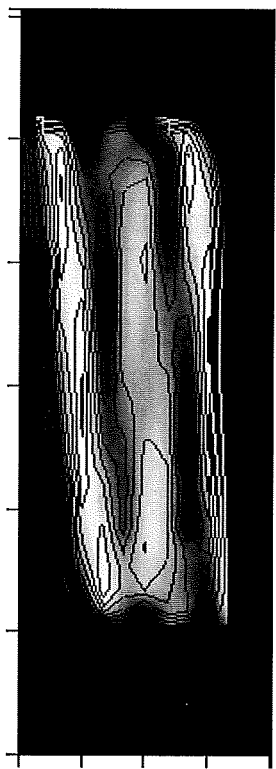
FIG. 29 is a simulation diagram of a sub-pixel in the wide viewing angle mode of a liquid crystal display device according to Comparative Example 1.

The transmittance of a sub-pixel was simulated below. The simulation was performed using the LCDMaster 3D (Shintech, Inc.). Both in Example 1 and Comparative Example 1, a case of applying voltage with which the transmittance becomes highest was simulated. FIG. 28 is a simulation diagram of a sub-pixel in the wide viewing angle mode of the liquid crystal display device according to Example 1. FIG. 29 is a simulation diagram of a sub-pixel in the wide viewing angle mode of the liquid crystal display device according to Comparative Example 1. A thicker color in FIG. 28 and FIG. 29 means a lower transmittance, and the white region has a high transmittance. Since the white region is wider in FIG. 28 than in FIG. 29, the liquid crystal display device according to Example 1 achieved a higher luminance in the wide viewing angle mode. This result also shows that the liquid crystal display device according to Example 1 has a higher mode efficiency.

Since the third electrode (counter electrode) in Example 1 is provided with openings, the liquid crystal molecules present in the optical openings of the sub-pixels are hardly affected by vertical electric fields in the wide viewing angle mode in which the common voltage is applied to the counter electrode. Accordingly, the liquid crystal molecules under the influence of fringe electric fields on the active matrix substrate side align in a state similar to that in a structure without electrodes on the color filter substrate side, leading to a high mode efficiency. In contrast, in Comparative Example 1, the counter electrode is a solid electrode without openings. The liquid crystal molecules present in the optical openings of the sub-pixels in the wide viewing angle mode in such a structure are directly affected by the vertical electric fields. In Comparative Example 1, when fringe electric fields are generated on the active matrix substrate side, vertical electric fields are simultaneously generated. This reduces the effective retardation, thereby seemingly reducing the mode efficiency.

<Consideration of Viewing Angle Depending on Display Mode>

Figure 30:
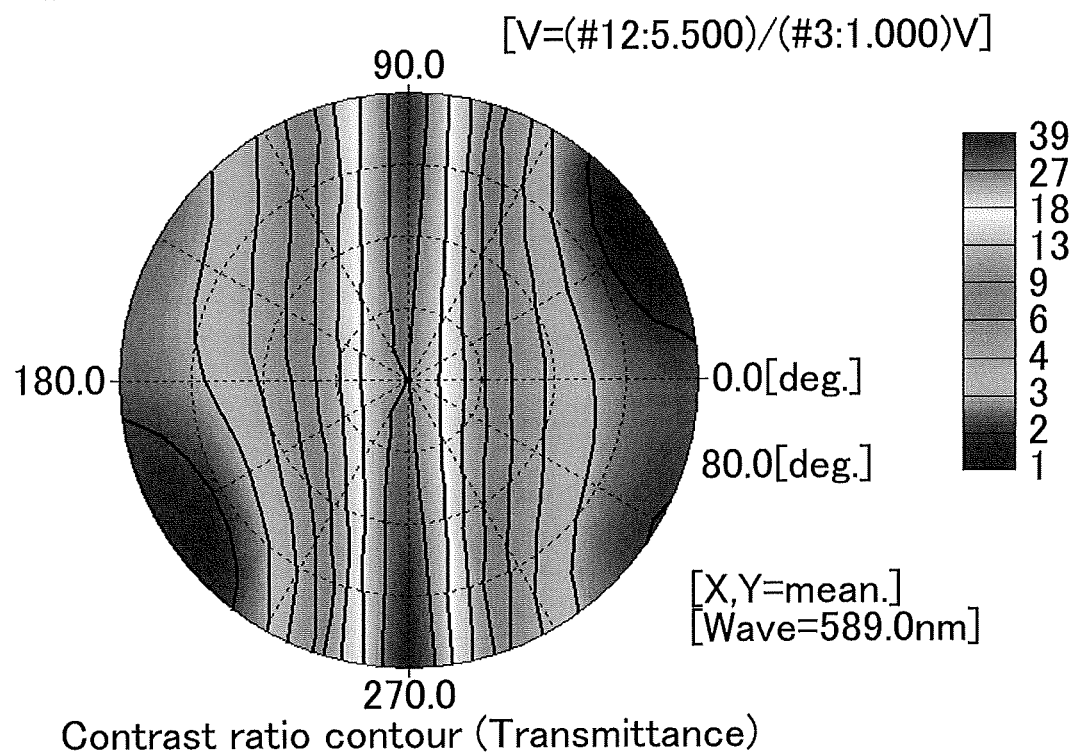
FIG. 30 is a simulation diagram in the narrow viewing angle mode of the liquid crystal display device according to Example 1.
Figure 31:
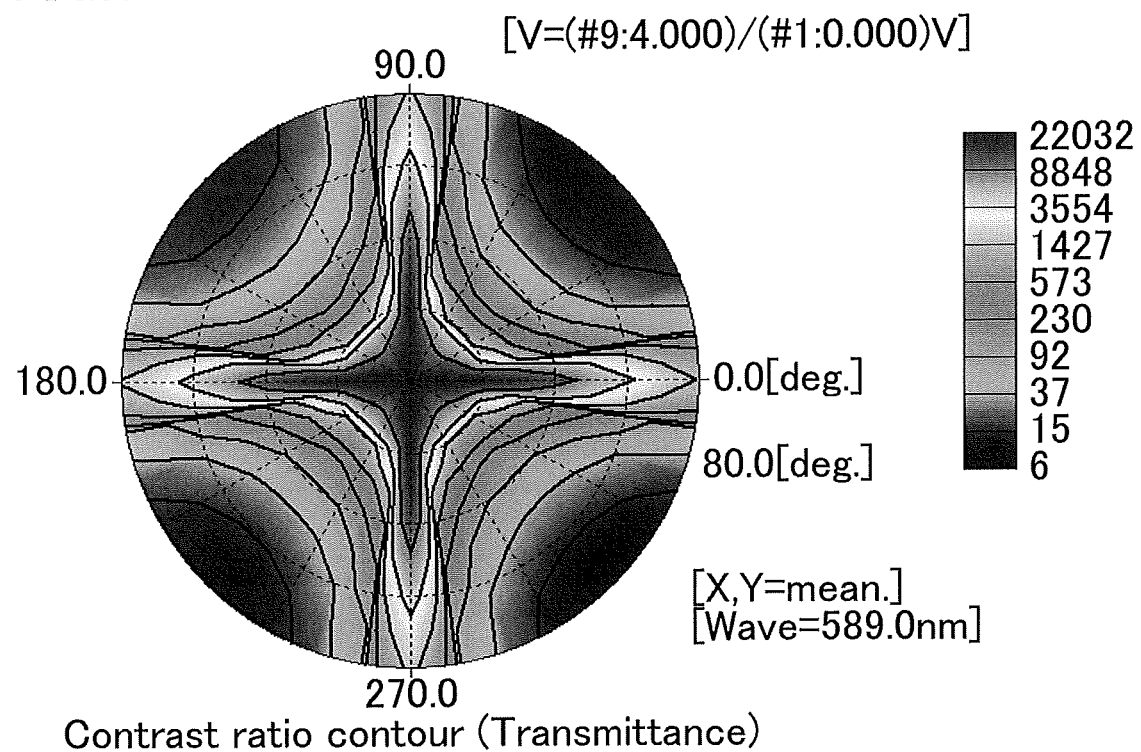
FIG. 31 is a simulation diagram in the wide viewing angle mode of the liquid crystal display device according to Example 1.

The viewing angle ranges in the wide viewing angle mode and the narrow viewing angle mode in the liquid crystal display device according to Example 1 were simulated below. The simulation was performed using the LCDMaster 3D (Shintech, Inc.). The simulation shows the contrast ratios in observation of the display panel at an azimuth of 0° to an azimuth of 360°. FIG. 30 is a simulation diagram in the narrow viewing angle mode of the liquid crystal display device according to Example 1. FIG. 31 is a simulation diagram in the wide viewing angle mode of the liquid crystal display device according to Example 1. In the narrow viewing angle mode, as shown in FIG. 30, the contrast ratio at the 90°-270° azimuth was high. Yet, the luminance in observation at a different azimuth is low, meaning that the image was hardly perceivable from the left-right directions and oblique directions. In the wide viewing angle mode, as shown in FIG. 31, the contrast ratio at the 90°-270° and 0°-180° azimuths was high, meaning that the image was perceivable at wider azimuths than in the narrow viewing angle mode. These simulations confirmed that switching application of voltage to the third electrode between alternating voltage and constant voltage enabled switching between the narrow viewing angle mode and the wide viewing angle mode.

REFERENCE SIGNS LIST

1: gate line
2: source line
3: TFT
10: active matrix substrate
11: first substrate
13: insulating layer
12: first electrode
14: second electrode
14a: linear electrode portion
14b: opening
20: liquid crystal layer
21: liquid crystal molecule
30: color filter substrate
31: second substrate
32: color filter
32B: blue color filter
32G: green color filter
32R: red color filter
33: third electrode
34: black matrix
41: first alignment film
42: second alignment film
50: dielectric layer
61: first polarizer
61A: absorption axis of first polarizer
62: second polarizer
62A: absorption axis of second polarizer
70: sub-pixel (first sub-pixel)
70B: first blue sub-pixel
70G: first green sub-pixel
70R: first red sub-pixel
71: second sub-pixel
71B: second blue sub-pixel
71G: second green sub-pixel
71R: second red sub-pixel
72: display unit
72B: blue display unit
72G: green display unit
72R: red display unit
73: color element
100: liquid crystal panel
101: first electrode drive circuit
102: second electrode drive circuit
103: third electrode drive circuit
200: control unit
201: image signal synthesis circuit
202: display mode selection circuit
203: third electrode application voltage switching circuit
204: database
211: raw image signal
212: image signal
213: display mode switching signal
214: first display mode selection signal
215: second display mode selection signal
216: AC signal
217: constant voltage signal
218: soft veil-view display switching signal
219: soft veil-view pattern image signal

What is claimed is:

1. A liquid crystal display device comprising:
a liquid crystal panel; and
a control circuit,
the liquid crystal panel including sub-pixels arranged in a matrix pattern in an in-plane direction and including an active matrix substrate, a liquid crystal layer containing liquid crystal molecules, and a color filter substrate in a stated order,
the sub-pixels including a red display unit, a green display unit, and a blue display unit, the red display unit consisting of a first red sub-pixel selected from an odd-number line and a second red sub-pixel selected from an even-number line and adjacent to the first red sub-pixel, the green display unit consisting of a first green sub-pixel selected from the odd-number line and a second green sub-pixel selected from the even-number line and adjacent to the first green sub-pixel, the blue display unit consisting of a first blue sub-pixel selected from the odd-number line and a second blue sub-pixel selected from the even-number line and adjacent to the first blue sub-pixel,
the active matrix substrate including a first substrate, and first electrodes and second electrodes stacked with an insulating layer in between, the second electrodes arranged in the respective sub-pixels,
the color filter substrate including a second substrate, a color filter, and a third electrode,
either the first electrodes or the second electrodes arranged with electrical connection over the sub-pixels,
each of the sub-pixels provided with an optical opening that allows light to pass through the liquid crystal panel,
the third electrode not superimposed with at least a portion of each of the optical openings in a plan view and arranged with electrical connection,
the control circuit configured to switch between application of alternating voltage and application of constant voltage to the third electrode,
the control circuit configured to apply alternating voltage to the third electrode in a first display mode that allows a first image to be observed in a narrow viewing angle range including a direction normal to the liquid crystal panel,
the control circuit configured to apply constant voltage, which is common to the first electrodes or the second electrodes, to the third electrode in a second display mode that allows the first image to be observed in a wide viewing angle range including the narrow viewing angle range,
the control circuit in the first display mode configured to supply image signals to the sub-pixels so as to allow a second image, different from the first image, to be observed in the wide viewing angle range and to be superimposed with the first image to make the first image less perceivable in the following manner (a) or (b), thus causing one of the first red sub-pixel and the second red sub-pixel, one of the first green sub-pixel and the second green sub-pixel, and one of the first blue sub-pixel and the second blue sub-pixel to be in display for the first image while the other of the first red sub-pixel and the second red sub-pixel, the other of the first green sub-pixel and the second green sub-pixel, and the other of the first blue sub-pixel and the second blue sub-pixel to be in a black display; (a) applying common voltage to the second electrodes while applying different magnitudes of voltage to two of the first electrodes corresponding to the respective first red sub-pixel and second red sub-pixel, applying different magnitudes of voltage to two of the first electrodes corresponding to the respective first green sub-pixel and second green sub-pixel, and applying different magnitudes of voltage to the respective first blue sub-pixel and second blue sub-pixel; or (b) applying common voltage to the first electrodes while applying different magnitudes of voltage to two of the second electrodes corresponding to the respective first red sub-pixel and second red sub-pixel, applying different magnitudes of voltage to the respective first green sub-pixel and second green sub-pixel, and applying different magnitudes of voltage to the respective first blue sub-pixel and second blue sub-pixel.

2. The liquid crystal display device according to claim 1, wherein the liquid crystal display device comprises a dielectric layer between the third electrode and the liquid crystal layer.

3. The liquid crystal display device according to claim 2, wherein the second substrate, the third electrode, the color filter, and the dielectric layer are arranged in a stated order.

4. The liquid crystal display device according to claim 1, wherein the color filter is a dielectric layer, and the second substrate, the third electrode, the color filter, and the liquid crystal layer are arranged in a stated order.

5. The liquid crystal display device according to claim 1, wherein the third electrode has a light-shielding property.

6. The liquid crystal display device according to claim 5, wherein the third electrode is a single- or multi-layered light-shielding electrode containing aluminum, molybdenum, chromium, titanium, or an alloy of any of these metals.

7. The liquid crystal display device according to claim 1, wherein the third electrode is a transparent electrode.

8. The liquid crystal display device according to claim 1, wherein the third electrode surrounds the optical openings in a plan view.

9. The liquid crystal display device according to claim 1, wherein the active matrix substrate includes a gate line and a source line that crosses the gate line, and the third electrode is superimposed with the gate line and the source line.

10. The liquid crystal display device according to claim 1, wherein the color filter substrate further includes a black matrix that is formed from a black resin and arranged around the optical openings in a plan view, and the third electrode is superimposed with the black matrix.

11. The liquid crystal display device according to claim 10, wherein the second substrate, the third electrode, and the black matrix are arranged in a stated order.

12. The liquid crystal display device according to claim 10, wherein the second substrate, the black matrix, and the third electrode are arranged in a stated order.

13. The liquid crystal display device according to claim 1, wherein the liquid crystal molecules align in a direction horizontal to the active matrix substrate in a non-voltage application state in which no voltage is applied to the liquid crystal layer,
the liquid crystal molecules in the first display mode align at a different azimuth while forming an angle with the active matrix substrate under an influence of electric fields generated by the first electrodes, the second electrodes, and the third electrode, and
the liquid crystal molecules in the second display mode align at a different azimuth while aligning parallel to the active matrix substrate under an influence of an electric field generated between the first electrodes and the second electrodes.

14. The liquid crystal display device according to claim 1, wherein the liquid crystal panel includes display units that utilize a soft veil-view function to display an image,
the display units each include a pair of sub-pixels arranged adjacent to each other, one of the sub-pixels being a first sub-pixel selected from odd-number lines and the other being a second sub-pixel selected from even-number lines, and
the control circuit in the first display mode supplies different image signals to the respective sub-pixels so as to allow a second image, different from the first image, to be observed in the wide viewing angle range.

15. The liquid crystal display device according to claim 1, wherein an absolute value of the alternating voltage is different from an absolute value of voltage applied to the first electrodes and the second electrodes.

* * * * *